United States Patent
Klosiewicz (12)

(10) Patent No.: US 6,255,395 B1
(45) Date of Patent: Jul. 3, 2001

(54) MASTERBATCHES HAVING HIGH LEVELS OF RESIN

(75) Inventor: Daniel W. Klosiewicz, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/273,509

(22) Filed: Mar. 22, 1999

(51) Int. Cl.⁷ .............................. C08L 23/10; C08B 3/22
(52) U.S. Cl. .................... 525/191; 525/210; 525/211; 525/216; 525/232; 525/240; 525/241; 524/270; 524/271; 524/274
(58) Field of Search ...................... 525/191, 210, 525/211, 216, 232, 240, 246; 524/528, 270, 271, 274

(56) References Cited

U.S. PATENT DOCUMENTS

| | | |
|---|---|---|
| 2,956,042 | 10/1960 | Underwood et al. . |
| 3,036,987 | 5/1962 | Ranalli . |
| 3,278,646 | 10/1966 | Lambert, Jr. . |
| 3,313,754 | 4/1967 | Logan . |
| 3,361,849 | 1/1968 | Cramer et al. . |
| 3,562,790 | 2/1971 | Coover et al. . |
| 3,663,488 | 5/1972 | Kail . |
| 3,666,836 | 5/1972 | John . |
| 3,937,762 | 2/1976 | Nahmias et al. . |
| 4,311,807 | 1/1982 | McCullough, Jr. et al. . |
| 4,354,004 | 10/1982 | Hughes et al. . |
| 4,508,786 | 4/1985 | Ishibashi et al. . |
| 4,578,316 | 3/1986 | Clauson et al. . |
| 4,663,219 | 5/1987 | Janocha et al. . |
| 4,666,989 | 5/1987 | McCullouch, Jr. et al. . |
| 4,786,533 | 11/1988 | Crass et al. . |
| 4,842,187 | 6/1989 | Janocha et al. . |
| 4,886,849 | 12/1989 | Hwo et al. . |
| 4,927,885 | 5/1990 | Hayashida et al. . |
| 4,973,625 | 11/1990 | Deyrup . |
| 5,026,778 | 6/1991 | Fujii et al. . |
| 5,043,204 | 8/1991 | Itaba et al. . |
| 5,075,156 | 12/1991 | Tanaka et al. . |
| 5,079,273 | 1/1992 | Kuroda et al. . |
| 5,128,183 | 7/1992 | Buzio . |
| 5,213,744 | 5/1993 | Bossaert . |
| 5,290,842 | 3/1994 | Sasaki et al. . |
| 5,502,140 | 3/1996 | Daughenbaugh et al. . |

FOREIGN PATENT DOCUMENTS

| | | |
|---|---|---|
| 3514398 | 10/1986 | (DE) . |
| 0288227 | 10/1988 | (EP) . |
| 0317276 | 5/1989 | (EP) . |
| 0441027 | 8/1991 | (EP) . |
| 0796884 | 9/1997 | (EP) . |
| 57-125047 | 8/1982 | (JP) . |
| 59-68215 | 4/1984 | (JP) . |
| 61-97416 | 5/1986 | (JP) . |
| 2104716 | 4/1990 | (JP) . |
| 5-39366 | 2/1993 | (JP) . |
| 6345909 | 12/1994 | (JP) . |
| 98/55537 | 12/1998 | (WO) . |

OTHER PUBLICATIONS

Brandrup, *Polymer Handbook*, pp. IV–337 to IV–359 (1975).
Brown et al. "Basic Structures of Polymers", *Principles of Polymer Systems*, pp. 23–30 (1982).
Karger–Kocsis, "Primary Spherulite Nucleation in Polypropylene–Based Blends and Copolymers", *Polypropylene Structure, Blends, and Composites*, pp.25–49 (1995).
Blom et al., "iPP/HDPE Blends: Interactions at Lower HDPE Contents", *Journal of Applied Polymer Science*, pp. 995–1006 (1995).
Bartczak et al., "Spherulite Nucleation in Blends of Isotactic Polypropylene with High–Density Polythylene", *Polymer*, pp. 537–543 (1986).
Miller, *The Structure of Polymers*, pp. 515–519 (1966).
Whelan, *Polymer Technology Dictionary*, p. 274 (1994).
Billmeyer, Jr., *Textbook of Polymer Science*, pp. 205–207 (1966).
Hawley, *The Condensed Chemical Dictionary*, pp. 709, 710, 826 (1971).
DeClippeleir, "Polypropylene Modified with Polybutylene: Properties and Markets", Presentation at the Polypropylene '97 6th Annual World Congress (1997).
Krohn et al., "A Comparison of the Oil, Oxygen and Water Vapor Permeation Rates of Various Polyethylene Blown Films", 1996 Polymers, Laminations and Coatings Conference, TAPPI Press (1996).

Primary Examiner—Nathan M. Nutter
(74) Attorney, Agent, or Firm—Greenblum & Berenstein, P.L.C.

(57) ABSTRACT

Masterbatch including at least about 65 wt % of resin having a R&B softening point as measured in accordance with ASTM 28-67. The masterbatch also includes a carrier polymer having a peak melting temperature, as measured by DSC, up to about 20° C. greater than the R&B softening point of the resin. A masterbatch pellet made by a method, including mixing a resin having a R&B softening point as measured in accordance with ASTM 28-67, and a carrier polymer having a peak melting temperature, as measured by DSC, up to about 20° C. greater than the R&B softening point of the resin, to form masterbatch composition including at least about 65 wt % of resin. The method of making the masterbatch pellet also includes pelletizing the masterbatch composition into masterbatch pellet. Methods of making a masterbatch, methods for making polymer product, and a polymer product.

59 Claims, No Drawings

MASTERBATCHES HAVING HIGH LEVELS OF RESIN

BACKGROUND OF THE INVENTION

1. Field of the Invention

This invention relates to resin masterbatches having high levels of resin (e.g., at least about 65 wt % of resin), and methods of use of the masterbatches in making polymer articles, such as polyolefin articles. In addition to resin, the masterbatches contain carrier polymer which may be, for example, polyethylene. The carrier polymer is selected based on the processability of the masterbatch and the effect on the final product. In particular, the carrier polymer is preferably selected to facilitate mixing with the resin and/or to facilitate solidification of the molten masterbatch. The masterbatch may be blended with a blend polymer, such as a blend polyolefin, to form a polymer blend, such as a polyolefin blend. The blend may be converted directly to the finished product, e.g., polypropylene film, molded goods, or adhesive, by mixing the masterbatch with the blend polymer, such as polyolefin, and processing the polymer blend into the finished product.

2. Discussion of Background

Polymers are useful in a wide variety of products. For instance, polymers may be used to make films, molded articles, and adhesives.

For instance, polyolefins are plastic materials useful for making a wide variety of valued products due to their combination of stiffness, ductility, barrier properties, temperature resistance, optical properties, availability, and low cost. Since the preferred polyolefins are semi-crystalline polymers, a number of these important properties such as stiffness, barrier properties, temperature resistance, and optical properties, depend on the ability of the polyolefin to crystallize in the most effective manner, and to the desired degree.

The process for forming a polyolefin product strongly affects the crystallization behavior of the material and its ultimate properties. For instance, when polypropylene or polyethylene is cast into thin film, the polymer cools so quickly that the ultimate level of crystallinity is reduced by this "quenching" process, and correspondingly the stiffness of the film is reduced. Cast polypropylene films typically exhibit a stiffness, measured as tensile modulus, of nominally 100 kpsi. Highly oriented polypropylene (OPP) films typically exhibit modulus values 2–4 times higher than the values for cast polypropylene film while non-oriented thick molded articles typically exhibit modulus values nominally 50 to 100% higher than cast polypropylene film. Also when making cast film, it is important that the polypropylene melt solidify quickly to promote high production rates, and also that the crystalline regions which are formed are not so large in size that they confer haze to the film.

Other molded polyolefin articles, particularly thin gauge products made by thermoforming, injection molding, or blow molding, are subject to similar constraints. Faster crystallization which permits rapid demolding and stiffer products is desired, as well as good optical properties promoted by small crystalline domain size.

As a means for improving the stiffness of polyolefins, the addition of a high softening point resin to polyolefins, such as polypropylene and polyethylene, is known. The composition of the resin is preferably such that it exhibits a significantly higher glass transition temperature ($T_g$) than the amorphous regions of the polypropylene ($T_g$ around −10° C.), and the resin is preferably highly compatible in the polypropylene. It is believed that the effect of the resin is to increase the $T_g$ of the amorphous polypropylene fraction and by doing so increase its tensile modulus at temperatures below 38° C.

The resins described above are friable solids which exhibit very low melt viscosity at the temperatures normally used to process polyolefin. An effective way to blend resin into polyolefin is in a separate compounding step prior to the final use of the blend. It is difficult to incorporate resin into polypropylene or polyethylene during an actual conversion step (for example film casting, sheet extrusion, etc.) because of the dusting characteristics and low melt viscosity of resins.

Accordingly, the use of masterbatches including resin are known to be a preferred way to incorporate resin into polypropylene formulations. U.S. Pat. No. 5,213,744 to BOSSAERT, the disclosure of which is herein incorporated by reference in its entirety, describes a process of forming a masterbatch involving a binary mixture of polyolefin and from 10 to 90 wt %, preferably 20 to 60 wt % of resin. All of the examples of BOSSAERT and claims in BOSSAERT are directed to a binary component masterbatch of polypropylene and resin.

By adding resin to polyolefin in the form of a masterbatch, the resin can be incorporated directly during processing and fabrication of the final product. Thus, the use of a masterbatch eliminates the need for a separate compounding step to incorporate the resin into the polyolefin formulation. Because of economic considerations, it is desirable to achieve as high a resin content in the masterbatch as possible without compromising the ability of the masterbatch to be uniformly blended into the polyolefin, e.g., during extrusion processing.

However, although BOSSAERT discloses the use of masterbatches having high levels of resin, BOSSAERT fails to disclose how to effectively process such high resin content masterbatches into pellets. In this regard, there are difficulties in mixing and pelletizing binary masterbatches of resin and polypropylene.

Regarding the mixing difficulties, the high melting point of polypropylene homopolymer which is about 165° C. for most polypropylene homopolymers hinders effective homogenization of the resin with the polypropylene homopolymer, even when using high shear mixing. With some polypropylenes, the extrudate can be very non-homogeneous, or if processed to a homogeneous state, the peak melting temperature of the masterbatch may be too high such that the melt strength is too low to process easily. For example, the mixing energy required to homogenize the masterbatch may increase the temperature so much that it is difficult to make pellets. As a result of these mixing difficulties, the energy required to compound and homogenize a blend can be high.

Regarding the pelletizing difficulties, the resulting extrudate may not be effectively cut into pellet-like particles by the cutter. For instance, when binary component masterbatches of polypropylene homopolymer and about 50 to 70 wt % resin are made, it is difficult to form pellets because the crystallization is slow such that the material leaving the extruder is too soft. Because the extrudate is soft, the product leaving the pelletizer may be a string of battered polymer, instead of pellets. Under these conditions, the product may also be large lumps and prills, some of which are large enough to put an excessive load on the cutter and dryer motors of the pelletizer. When binary component masterbatches of polypropylene homopolymer and greater than about 70 wt % resin are made, it may be difficult to form pellets because the material leaving the extruder is too brittle. Because the solidified extrudate is brittle, the final product is granulated material, instead of pellets. Thus, the rheology of high resin content masterbatches of polypropylene homopolymer and resin, such as those disclosed by BOSSAERT, prevents the efficient formation of pellets. As a result, in binary resin/polypropylene homopolymer masterbatches, a resin content of about 50 wt % is the maximum amount that can be achieved without severely affecting processing of the masterbatch.

Similar to masterbatches involving polypropylene homopolymer, it is difficult to process most binary masterbatches of propylene copolymer and high levels of resin. In particular, binary masterbatches of propylene copolymer and high levels of resin are often either too soft or too brittle for processing. When the masterbatch is too soft, the masterbatch composition cannot be cut easily into separate pellets. When the masterbatch is too brittle, the final product is granulated material.

As discussed above, adding high softening point resin to polyolefin, such as polypropylene, will increase the glass transition temperature ($T_g$) of the amorphous phase of the polyolefin and modify its properties. One effect of resin addition is greater stiffness. To achieve significant property modification the resin is preferably added at levels at or above about 2 wt % of the total polyolefin blend. For instance, oriented polypropylene films preferably have about 2 to 30 wt %, more preferably about 5 to 15 wt %, of resin. Cast polypropylene films preferably have about 2 to 10 wt %, more preferably about 3 to 7 wt %, of resin. Polyethylene films preferably have about 2 to 30 wt %, more preferably about 5 to 15 wt %, of resin.

In addition to polyolefins, resin masterbatches may be added to other polymers. For instance, resin masterbatches may be added to adhesives. In adhesive applications, resin masterbatches give fewer handling problems and increase the melt viscosity of the resin component, making the masterbatch easier to blend with the blend polymer of the adhesive.

Adding high levels of resin via a masterbatch having resin and carrier polymer, however, requires that high levels of masterbatch be added which means that a significant amount of carrier polymer is added which often has a negative impact. For instance, in film applications, the carrier polymer may negatively impact haze, ductility and impact properties, formulation cost, and crystallization rate of polymer blends. In adhesive applications, the carrier polymer may negatively affect tack and may increase modulus. It would therefore be desirable to achieve the favorable effects of resin addition while adding lower amounts of carrier polymer, by achieving high resin concentration in masterbatches which are easy to process.

SUMMARY OF THE INVENTION

The present invention is directed to masterbatches and methods of making masterbatches including resin and carrier polymer. The present invention is also directed to masterbatch pellets comprised of resin and carrier polymer. Further, the present invention is directed to combining masterbatches with blend polymer to form a polymer blend and forming articles out of the polymer blend.

The present invention also involves resin masterbatches having high levels of resin (e.g., at least about 65 wt % of resin). In addition to resin, the masterbatch contains carrier polymer. The carrier polymer is selected based on the processability of the masterbatch and the effect on the final product. In particular, the carrier polymer is preferably selected based on the ability of the carrier polymer to mix with the resin and/or based on the solidification rate of the molten masterbatch. The present invention also involves methods of making high resin content masterbatches.

The present invention is also directed to methods for using masterbatches having high levels of resin in making polymer articles, such as polyolefin articles. In this regard, the resin masterbatch may be blended with polymer, such as polyolefin, to form a finished product. The blend may be converted directly to the final product by mixing the masterbatch with blend polymer during extrusion to produce the final product.

The present invention also involves finished products which may be, e.g., a film, a molded good, or an adhesive. For instance, the finished product may be an oriented polypropylene film.

In accordance with one aspect, the present invention is directed to a masterbatch, comprising: at least about 65 wt % of resin having a R&B softening point as measured in accordance with ASTM 28-67; and carrier polymer having a peak melting temperature up to about 20° C. greater than the R&B softening point of the resin.

In accordance with another aspect, the present invention is directed to a masterbatch pellet made by a method, comprising: mixing resin having a R&B softening point as measured in accordance with ASTM 28-67, and carrier polymer having a peak melting temperature up to about 20° C. greater than the R&B softening point of the resin, to form masterbatch composition comprising at least about 65 wt % of resin; and pelletizing the masterbatch composition into masterbatch pellet.

In accordance with still another aspect, the present invention is directed to a method of making a masterbatch, comprising: mixing resin having a R&B softening point as measured in accordance with ASTM 28-67, and carrier polymer having a peak melting temperature up to about 20° C. greater than the R&B softening point of the resin, to form a masterbatch comprising at least about 65 wt % of resin.

In accordance with yet another aspect, the present invention is directed to a method for making polymer product, comprising: forming a masterbatch comprising at least about 65 wt % of resin having a R&B softening point as measured in accordance with ASTM 28-67, and carrier polymer having a peak melting temperature up to about 20° C. greater than the R&B softening point of the resin; combining the masterbatch with blend polymer to form polymer blend; and forming the polymer blend into polymer product.

In accordance with another aspect, the present invention is directed to a masterbatch, comprising: at least about 65 wt % of resin; and carrier polymer which is such that a test masterbatch comprising 65 wt % of test resin and 35 wt % of the carrier polymer would solidify, i.e., stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

In accordance with still another aspect, the present invention is directed to a masterbatch pellet made by a method, comprising: mixing resin having a R&B softening point as measured in accordance with ASTM 28-67, and carrier polymer which is such that a test masterbatch comprising 65 wt % of test resin and 35 wt % of the carrier polymer would solidify, i.e., stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C., to form masterbatch composition comprising at least about 65 wt % of resin; and pelletizing the masterbatch composition into masterbatch pellet.

In accordance with yet another aspect, the present invention is directed to a method of making a masterbatch, comprising: mixing resin and carrier polymer which is such that a test masterbatch comprising 65 wt % of test resin and 35 wt % of the carrier polymer would solidify, i.e., stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

In accordance with still another aspect, the present invention is directed to a method for making polymer product, comprising: forming a masterbatch comprising at least about 65 wt % of resin, and carrier polymer which is such that a test masterbatch comprising 65 wt % of test resin and 35 wt % of the carrier polymer would solidify, i.e., stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.; combining the masterbatch with blend polymer to form polymer blend; and forming the polymer blend into polymer product.

In accordance with another aspect, the carrier polymer has a peak melting temperature no greater than about 10° C. above the R&B softening point of the resin. The peak melting temperature of the carrier polymer may be less than about 150° C. The carrier polymer may have a melt index of about 0.5 to 30 dg/min, as measured in accordance with ASTM D-1238, 190° C. and 2.16 kg load. The carrier polymer may comprise primary carrier polymer and secondary carrier polymer. The carrier polymer may comprise polyethylene, linear low density polyethylene (LLDPE), propylene-ethylene random copolymer, or non-polypropylene homopolymer.

In accordance with another aspect, the resin may comprise hydrogenated resin, C9 hydrocarbon resin, or dicyclopentadiene hydrocarbon resin. The resin may have a R&B softening point of at least about 70° C., as measured in accordance with ASTM 28-67.

In accordance with another aspect, the mixing of the resin and carrier polymer comprises an initial mixing which is carried out at a masterbatch temperature within about 20° C. of the R&B softening point of the resin and within about 20° C. of the peak melting temperature of the carrier polymer.

In accordance with another aspect, the mixing is carried out in a twin screw extruder under shear conditions in which less than about 70 watt-hr/lb of mechanical energy is required for substantial homogenization of the masterbatch composition.

In accordance with yet another aspect, a ratio of a viscosity of molten carrier polymer to a Brookfield viscosity of the resin is less than about 20 to 1, wherein the viscosities are measured at 10° C. above the peak melting temperature of the carrier polymer and the carrier polymer is molten during viscosity measurement, wherein the Brookfield viscosity is 10 measured in accordance with ASTM D-6267, and wherein the viscosity of the carrier polymer is measured by capillary shear rheometry with a shear rate of $1000$ $s^{-1}$.

In accordance with another aspect, the masterbatch comprises about 70 to 90 wt % of resin.

In accordance with another aspect, the polymer blend comprises about 2 to 25 wt % of masterbatch.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

Before further discussion, a definition of the following terms will aid in the understanding of the present invention.

Masterbatch: a mixture of 2 or more ingredients which may be used to simplify adding at least one of these ingredients to a material as a blend, rather than as an individual ingredient or as a plurality of individual ingredients.

Carrier polymer: polymer combined with resin to form a masterbatch. For example, a polyolefin combined with resin to form a masterbatch may be referred to as carrier polyolefin. For instance, the carrier polymer may comprise any number of carrier polymers which facilitate mixing of the masterbatch which will be referred to herein for ease of reference as "primary carrier polymers", and any number of carrier polymers which improve the compatibility of the masterbatch and the blend polymer which will be referred to herein for ease of reference as "secondary carrier polymers".

Blend polymer: polymer which is combined with masterbatch. For example, a polyolefin which is combined with masterbatch may be referred to as blend polyolefin.

Polymer blend: final formulation resulting from a combination of masterbatch and polymer. For example, the final formulation resulting from a combination of masterbatch and polyolefin may be referred to as polyolefin blend.

Resin: hydrocarbon resin, rosin resin, and/or terpene resin.

Hydrocarbon resin: a low molecular weight (i.e., a number average molecular weight of about 250 to 2000 as determined by size exclusion chromatography (SEC)) thermoplastic polymer synthesized via thermal or catalytic polymerization of cracked petroleum distillate, coal tar fraction, and/or pure olefinic monomer, and hydrogenation products thereof.

Rosin resin: a low molecular weight (i.e., a number average molecular weight of about 250 to 2000 as determined by size exclusion chromatography (SEC)) thermoplastic polymer synthesized from rosin (such as wood rosin, gum rosin, and tall oil rosin), and hydrogenation products thereof.

Terpene resin: a low molecular weight (i.e., a number average molecular weight of about 250 to 2000 as determined by size exclusion chromatography (SEC)) thermoplastic polymer synthesized via catalytic polymerization of terpene monomer (such as α-pinene, β-pinene, limonene, and dipentene), and hydrogenation products thereof.

Pure monomer hydrocarbon resin: hydrocarbon resin synthesized via thermal or catalytic polymerization of monomer composition comprising synthetically generated or highly purified monomer species, e.g., styrene from ethyl benzene or alpha methyl styrene from cumene.

C9 hydrocarbon resin: hydrocarbon resin synthesized via thermal or catalytic polymerization of monomer derived from petroleum processing, e.g., cracking, containing unsaturated aromatic C8, C9, and/or C10 olefin species with a boiling range of about 100 to 300° C. at atmospheric pressure.

C5 hydrocarbon resin: hydrocarbon resin synthesized via thermal or catalytic polymerization of monomer derived from petroleum processing, e.g., cracking, containing unsaturated hydrocarbons comprising C5 and/or C6 olefin species boiling in the range from about 20 to 100° C. at atmospheric pressure.

Prill: spherical particle or rounded ball which may be formed by an agglomeration of particles. For instance, several molten pellets may combine together to form a prill.

The present invention involves resin masterbatches having high levels of resin (e.g., at least about 65 wt % of resin). In addition to resin, the masterbatches contain carrier polymer. The carrier polymer is selected based on the processability of the masterbatch and the effect on the final product. In particular, the carrier polymer is preferably selected based on the ability of the carrier polymer to mix with the resin and/or the solidification rate of the molten masterbatch.

The resin masterbatch may be blended with polymer, such as polyolefin, to form a polymer blend, such as a polyolefin blend. The polymer blend may be converted directly to a final or finished product, e.g., polypropylene film, molded good, or adhesive, by mixing the masterbatch with blend polymer during extrusion to produce the final product.

The masterbatch of the present invention is advantageous because it has a relatively high amount of resin, whereby a small amount of carrier polymer is added to the polymer blend. Another advantage of high resin content masterbatches is that not as much masterbatch is required to add a given amount of resin to the polymer blend.

The masterbatch of the present invention involves a plurality of components, e.g., two, three, four, or more components. In this regard, two component masterbatches may be referred to as binary masterbatches and three component masterbatches may be referred to as ternary masterbatches.

According to the present invention, the masterbatch includes resin and carrier polymer. The carrier polymer facilitates mixing with the resin to form the masterbatch and/or facilitates mixing of the masterbatch with blend polymer. The carrier polymer may be comprised of any number of carrier polymers such as one, two, three, or more. For example, the carrier polymer may comprise any number of carrier polymers which facilitate mixing of the masterbatch which will be referred to herein for ease of reference as "primary carrier polymers", and any number of carrier polymers which improve the compatibility of the masterbatch and the blend polymer which will be referred to herein for ease of reference as "secondary carrier polymers". In this regard, the secondary carrier polymer may be more compatible with the blend polymer than the primary carrier polymer.

The amount of resin in the masterbatch is preferably at least about 65 wt %, and more preferably at least about 70 wt %, with ranges of preferably about 65 to 95 wt %, more preferably about 70 to 90 wt %, and most preferably about 75 to 85 wt %, with a preferred value of about 80 wt %, and a most preferred upper limit of about 85 wt %. The amount of carrier polymer is preferably up to about 35 wt %, and more preferably up to about 30 wt %, with ranges of preferably about 5 to 35 wt %, more preferably about 10 to 30 wt %, and most preferably about 15 to 25 wt %, with a preferred value of about 20 wt %. In masterbatches including a primary carrier polymer and a secondary carrier polymer, the amount of primary carrier polymer is preferably about 5 to 20 wt %, more preferably about 10 to 15 wt %, with a preferred value of about 12 wt %; and the amount of secondary carrier polymer in the masterbatch is preferably about 2 to 15 wt %, more preferably about 5 to 10 wt %, with a preferred value of about 8 wt %.

Preferred resins suitable for use in the masterbatch include hydrocarbon resins, rosin resins, and terpene resins. For instance, the resin is preferably an aliphatic compatible product derived from rosin, terpene, or hydrocarbon feedstocks. The resin preferably has a low hydrogen bonding index, i.e., poorly hydrogen bonded, which resins include those having only carbon and hydrogen. Further, the resin preferably has a solubility parameter which is about 7.5 to 9.5 $(cal/cm^3)^{1/2}$, more preferably about 8 to 9 $(cal/cm^3)^{1/2}$. Hydrogen bonding index and solubility parameter are discussed in BRANDRUP *Polymer Handbook* (1975), the disclosure of which is herein incorporated by reference in its entirety, with particular attention drawn to pages IV-337 to IV-359. Solubility parameter is also discussed in BROWN et al., "Basic Structures of Polymers", *Principles of Polymer Systems* (1982), the disclosure of which is herein incorporated by reference in its entirety, with particular attention drawn to pages 23–30. Preferred examples of hydrocarbon feedstock hydrocarbon resins include hydrogenated C9 and hydrogenated dicyclopentadiene (DCPD) hydrocarbon resins, such as DCPD-aromatic copolymers.

The resin preferably has a ring and ball (R&B) softening point (in accordance with ASTM 28-67) of at least about 70° C., more preferably at least about 100° C., even more preferably at least about 120° C., and most preferably at least about 135° C., with ranges of preferably 70° C. to 180° C., more preferably about 100° C. to 170° C., and most preferably about 135° C. to 160° C. As discussed in more detail below, the softening point of the resin is preferably similar to or above the melting point of the carrier polymer of the masterbatch. In this regard, the resin preferably has a sufficient viscosity to facilitate mixing and to allow an extruder to put work into the mixture.

The resin has a number average molecular weight (Mn), as measured by size exclusion chromatography, below the molecular weight of the carrier polymer. Although resins have been defined in this application to have a number average molecular weight of between about 250 to 2000 daltons, the resin preferably has a number average molecular weight of about 300 to 1500, more preferably about 300 to 1200.

In the present application, number average molecular weight (Mn) is measured using the following size exclusion chromatography (SEC) process. A column set for the analysis consists of four Waters "Ultrastyragel" columns of 500, 500, 1000, and 100 Å pore size, in series, (Part Nos. WAT 010571, 010571, 010572, 010570 respectively) available from Waters Corporation, Milford, Mass. The molecular weight calibration is calculated from the peak elution times of a standard set of narrow molecular weight distribution polystyrene polymers. The calibration set encompasses 18 standards ranging in peak molecular weight from 162 to 43,900. The peak molecular weight of a narrow molecular weight standard is defined as equal to $(MwMn)^{1/2}$ (ASTM test method D3536-76). The calibration curve is defined by a third degree polynomial curve fit of a plot of log MW vs. $V_e/V_r$, where $V_e$ is the elution volume of the standard and $V_r$ is the elution volume of the reference peak, oxygen, present as dissolved air in the injected solution. The columns and detector cell (Hewlett-Packard Differential Refractometer) are maintained at 40° C. The solvent (mobile phase) is tetrahydrofuran containing 250 ppm butylated hydroxytoluene (BHT, 2,6-di-tert-butyl-4-methylphenol) as a stabilizer (the tetrahydrofuran with BHT being available from Burdick and Jackson, Muskegon, Mich.). The mobile phase reservoir is purged with helium and is maintained at a flow rate of 1 milliliter per minute. Under these conditions, BHT elutes at 35.86 minutes. Samples are dissolved in THF, 0.25% wt/vol, and filtered through a 0.45 micron pore size "TEFLON" polytetrafluoroethylene membrane filter prior to injection (200 microliters) into the chromatograph. Thus, the number average molecular weight is the "polystyrene equivalent" molecular weight as calculated from the calibration curve.

The resin is preferably an aliphatic compatible resin with an odorless mineral spirit (OMS) final cloud point of less than about 0° C., but preferably less than about −40° C. Odorless mineral spirit (OMS) final cloud point was determined through the following test. Ten (10 wt %) weight percent of a resin is placed in a test tube containing ninety (90 wt %) weight percent of an odorless mineral spirit (OMS) which is "Shell-Sol 71" odorless mineral spirit available from Shell Chemical Company, Houston, Tex. The test tube containing the sample is heated until a clear solution is formed. The solution is then cooled until turbidity of the solution is observed. The onset of turbidity is recorded as the initial cloud point. Cooling of the solution is continued until the solution is completely turbid. The final cloud point is the point at which total turbidity is observed.

Examples of the resin of the masterbatch include "Res A-2468™, "MBG 273™", "Regalite-125®", "Regalrez 1139®", and "Regalrez 1128®" resins, which are hydrogenated hydrocarbon resins with a R&B softening point of above 120° C., all of which are available from Hercules Incorporated, Wilmington, Del.

Other resins exhibiting low molecular weight, aliphatic compatibility, and high softening point can also be used with similar effectiveness such as those resins described in U.S. Pat. No. 5,213,744 to BOSSAERT; U.S. Pat. No. 5,502,140 to DAUGHENBAUGH et al. (which discloses DCPD-aromatic copolymers); and U.S. application Ser. No. 08/618,756 to KLOSIEWICZ, filed Mar. 20, 1996, entitled "Masterbatch Formulations for Polyolefin Applications", the disclosures of which are herein incorporated by reference in their entireties.

While not wanting to be bound by theory, when the carrier polymer is different from the blend polymer, the resin may act as a "diluent" which may compatibilize and improve the final distribution of the carrier polymer in the blend polymer. Additionally, the resin, when added to polypropylene blend polymer, associates with the amorphous phase of the polypropylene and raises the $T_g$ of the polypropylene amorphous phase and ultimately its modulus.

The carrier polymer in the masterbatch comprises polymer which may be similar to the blend polymer, or if significantly different from the blend polymer, the carrier polymer is present in low levels in the masterbatch so that it is incorporated at low levels (preferably less than about 5 wt %) in the final polymer blend. The carrier polymer preferably has a low hydrogen bonding index, i.e., has few or no polar groups in the polymer structure, which carrier polymers include those having only carbon and hydrogen. Further, the carrier polymer preferably has a solubility parameter which is about 7.5 to 9.5 $(cal/cm^3)^{1/2}$, more preferably about 8 to 9 $(cal/cm^3)^{1/2}$.

The carrier polymer preferably mixes easily with high levels of the resin, and preferably assures that the resulting blend will solidify and be converted into masterbatch pellets in an efficient manner. The peak melting temperature of the carrier polymer is preferably not much greater than the R&B softening point of the resin to facilitate mixing of the carrier polymer and the resin. In this regard, the resin can be homogenized with the carrier polymer more efficiently if the actual mixing of the ingredients can be caused to occur temperatures where the resin retains a high melt viscosity and more elastic characteristics. Poorly mixed extrudate can exhibit very high extrudate swell and can have a "stickier" character than uniformly mixed extrudate. Both factors can promote agglomeration of the extruded material rather than formation of individual pellets.

The carrier polymer which is combined with the resin in the masterbatch of the present invention has at least one, more preferably two, and most preferably three, of the following properties:

(1) preferably the polymer is a semi-crystalline polymer with a peak melting temperature, as measured by DSC as discussed below, that is less than about 20° C. greater than the R&B softening point of the resin, more preferably that is less than about 10° C. greater than the R&B softening point of the resin, and most preferably that is substantially no greater than the R&B softening point of the resin;

(2) melt index (MI) of preferably about 0.5 to 30 dg/min, more preferably about 1 to 20 dg/min, and most preferably about 2 to 10 dg/min, as measured in accordance with ASTM D-1238, 190° C. and 2.16 kg load; and (3) when mixed with the resin, the carrier polymer preferably forms a masterbatch which crystallizes at fast rates even when the carrier polymer is present in the masterbatch at low concentrations. The crystallization rate can be determined using reproducible test conditions, so that the obtained values are meaningfully accurate. In particular, molten masterbatch comprising 65 wt % resin and 35 wt % of carrier polymer preferably solidifies, i.e., stretches less than 5% when 5 lb$_f$ is applied to an extruded test masterbatch strand, within 10 seconds after exiting a 60 cm long water bath at 25° C. in which the extruded test masterbatch strand is submerged for up to 4 seconds, wherein the resin is a hydrogenated C9 hydrocarbon resin having a R&B softening point of 140° C. An example of such a resin is "MBG 273™" resin, available from Hercules Incorporated, Wilmington, Del. Although other hydrogenated C9 resins having a R&B softening point of 140° C. may have compositions which differ from "MBG 273™" resin, as long as a hydrogenated C9 hydrocarbon resin having a R&B softening point of 140° C. is selected as the test resin, the test resin should not significantly affect the test results if all other variables are held constant. During the test, the extruded test masterbatch strand is extruded at a rate of 1.0 to 1.2 kg/hr/strand while drawing the strand at a nominal rate of 17 cm/sec using a pelletizer, and wherein the extruded test masterbatch strand has a 0.05 to 0.06 inch diameter, and enters the water bath at a temperature of 200° C.±10° C. Under these conditions, the masterbatch of the present invention solidifies more preferably within about 5 seconds, and most preferably solidifies within about 3 seconds after exiting the cooling bath. In contrast with the masterbatches of the present invention, if polypropylene is used as the carrier polymer, the molten masterbatch would normally require about 20 seconds to solidify under the above-noted conditions. In view of the above, the crystallization rates of the present invention are a distinct improvement which improves the efficiency with which the resin masterbatches can be produced.

As noted above, the peak melting temperature of the carrier polymer is preferably no greater than about 20° C. greater than the R&B softening point of the resin to facilitate mixing of the carrier polymer and the resin. While not wanting to be bound by theory, if the peak melting temperature of the carrier polymer is too high, the melt viscosity of the resin will be too low to mix efficiently with the carrier polymer at its peak melting temperature. It should be noted that if the peak melting temperature of a carrier polymer is lower than the R&B softening point of a resin, the carrier polymer will usually have sufficient viscosity at the R&B softening point of the resin to allow mixing. However, if the peak melting temperature of the carrier polymer is too low, the masterbatch may not crystallize fast enough such that the masterbatch is sticky during pelletizing and, therefore, pelletizing is difficult.

Taking into consideration that the peak melting temperature of the carrier polymer is preferably no greater than about 20° C. greater than the R&B softening point of the resin, the peak melting temperature, as measured by DSC as discussed below, of the carrier polymer is preferably less than about 150° C., more preferably less than about 140° C., and most preferably less than about 135° C., and is preferably at least about 90° C., more preferably at least about 100° C., and most preferably at least about 120° C., with ranges of preferably about 120 to 150° C., more preferably about 120 to 140° C., and most preferably about 120 to 135° C. These ranges are based on the criteria that resins preferably utilized in plastics applications most typically have R&B softening points less than about 140° C.

As indicated above, the peak melting temperature is determined using differential scanning calorimetry (DSC). In particular, a DuPont DSC 2910 differential scanning calorimeter module with a DuPont Thermal Analyst TA 2000 is used to make the measurements. Also, the temperature was calibrated using an Indium standard. The instrument and its general operation are described in the DSC 2910 Operator's Manual, published 1993 by TA Instruments, New Castle, Del., the disclosure of which is herein incorporated by reference in its entirety.

To obtain each peak melting temperature measurement, a sample of about 10 mg±5 mg is placed in an aluminum sample pan on a Perkin-Elmer AM-2 Autobalance. DSC scans are made at heating rates of 20° C. per minute from room temperature (about 20° C.) to about 200° C. Heat flow (in mcal/sec) is plotted vs. temperature. The peak melting point of the sample is taken as the maximum values of the endothermic peaks. For example, where the scan includes a number of peaks, the peak melting temperature would be determined using the highest temperature peak of the scan.

Regarding the melt index (MI) of the carrier polymer, MI is inversely proportional with molecular weight (MW) of the polymer. As discussed below, the MI of the carrier polymer is balanced between opposing characteristics.

Low MI is generally desirable for mixing the carrier polymer and the resin to form the masterbatch because the resulting blend will have high melt elasticity or melt strength, making it easier to convert the molten blend into pellet form. If the MI is too low (MW too high), however, it becomes more difficult to mix the carrier polymer with the blend polymer when the masterbatch is used to make a polymer blend. The effectiveness of the carrier polymer is dependent on achieving a thorough and finely dispersed distribution of the carrier polymer throughout the final polymer blend. As a result, the effectiveness of the carrier polymer is dependent on the degree of distribution of the carrier polymer in the masterbatch, combined with the effectiveness of the carrier polymer in distributing the masterbatch throughout the polymer blend. For instance, in film applications, if the distribution of the masterbatch in the blend polymer is inadequate, the resulting film may have haze. With this in mind, the compatibility of dissimilar polymers is increased with decreasing MW, and as a result it may be preferred that the carrier polymer have an MI above a certain value to promote good compatibility in the final polymer blend.

High MI is generally desirable both for mixing the resin with the carrier polymer to make the masterbatch, and to promote more effective mixing of carrier polymer with the blend polymer in the final polymer blend. Carrier polymers having higher MI (lower MW and higher flow) are desirable because lower MW and higher flow facilitate distribution of the carrier polymer throughout the blend polymer in finer and more numerous domains, such that the carrier polymer may be miscible in the blend polymer. If the MI is too high, however, the melt fluidity can be excessive and the masterbatch will have insufficient melt strength to be pelletized effectively and/or to promote efficient mixing of the masterbatch with the blend polymer in the final polymer blend.

As noted above, the carrier polymer preferably results in a masterbatch which crystallizes at fast rates, even when the carrier polymer is present in the masterbatch at low concentrations. The fast crystallization rates ensure that the masterbatch composition is non-tacky during pelletizing to facilitate processing. Thus, one preferred purpose of the carrier polymer is to cause crystallization in masterbatches including resin which would otherwise take a significant amount of time to solidify. In particular, the masterbatch preferably solidifies within a few seconds of exiting the extruder to allow cutting of the masterbatch by a pelletizer or to prevent agglomeration of pellets when die face pelletization is used. For instance, in masterbatches comprising 70 wt % resin and 30 wt % of carrier polymer in accordance with the invention, the masterbatch may take about 1 to 2 seconds to adequately solidify, whereas 70 wt % resin masterbatches having carrier polymers outside the present invention, such as a carrier polymer which is predominantly polypropylene homopolymer, may take about 10 to 30 seconds to adequately solidify.

The carrier polymer or carrier polymers may be composed of any polymer, such as homopolymer or copolymer having any number of different monomers, which meets at least one of items (1) to (3) above. Thus, primary and secondary carrier polymers may be homopolymers or copolymers having any number of different monomers, which meet at least one of the above three characteristics. Examples of carrier polymers in accordance with the invention include poly-1-butene, polyethylene, butene-ethylene copolymers, propylene copolymers such as propylene-ethylene random copolymer, and blends thereof. Preferred polyethylenes include HDPE, LDPE, and LLDPE.

Regarding primary carrier polymers and secondary carrier polymers, an example of a preferred primary carrier polymer is LLDPE, although HDPE and LDPE may be used with good effect. Taking into consideration that secondary carrier polymers are selected based on compatibility with the blend polymer, an example of a preferred secondary carrier polymer is propylene-ethylene random copolymer when the blend polymer is polypropylene.

In LLDPE, the monomer feed for forming the polymer includes ethylene and at least one other species of monomer which is preferably a 1-olefin, or a mixture of 1-olefins. These 1-olefins are preferably mainly either 1-butene, 1-hexene, or 1-octene. The polymerization occurs in a linear manner, just as for HDPE. However, because the 1-olefins are polymerized with ethylene, there are numerous positions that have a short alkyl branch chain sticking out from the linear molecule. This branch chain is either an ethyl chain, a butyl chain, or a hexyl chain, when 1-butene, 1-hexene, or 1-octene respectively is used. There are numerous types of LLDPE products, and they can differ by the type and level of 1-olefin used to make the polymer, how homogeneously or heterogeneously the 1-olefin is distributed among the various polymer chains, as well as the molecular weight properties of the polymer. In summary, LLDPE is a linear polymer just like HDPE, only HDPE is made from only ethylene, while LLDPE is made from a mixture of ethylene and some amount of another monomer which is preferably a 1-olefin.

LLDPE is the preferred carrier polymer for the masterbatch because of its ability to mix with resin and because of its effect on the final product, e.g., clarity of the final product, as discussed below. In this regard, LLDPE is relatively inert and does not have much affect on the final product. LLDPE is also preferred because the comonomer content may be varied to vary the properties of the polymer.

The LLDPE of the present invention preferably has a density of about 0.87 to 0.93 g/cm$^3$, more preferably about 0.890 to 0.925 g/cm$^3$, and most preferably about 0.910 to 0.920 g/cm$^3$. The LLDPE of the present invention preferably has MI values as discussed in item (2) above. As an example, masterbatches containing high levels of resin can be efficiently made with LLDPE having an MI of 1.0 dg/min. However, when masterbatches containing LLDPE having an MI of 1.0 dg/min were used to modify polypropylene for subsequent conversion into oriented polypropylene film, the oriented film exhibited higher haze values due to the presence of the LLDPE having an MI of 1.0 dg/min from the masterbatch. In contrast, when the LLDPE having an MI of 1.0 dg/min in the masterbatch is replaced with a cast film grade LLDPE having an MI of 6.0 dg/min, the masterbatches can be efficiently made and the optical properties were improved. It is suspected that the best LLDPE for the present invention preferably has a narrow molecular weight distribution (MWD), with the higher flow cast film grade LLDPE's representing examples of this type of polymer.

Examples of LLDPE include "Dowlex 2035" and "Dow Engage 8100" LLDPE available from Dow Chemical, Midland, Mich.; "Montell 12C01" LLDPE available from Montell Incorporated, Wilmington, Del.; "DSM 1016LF" and "DSM 1016" LLDPE available from DSM, Geleen, the Netherlands. "Dow Engage 8100" LLDPE is an LLDPE with a high level of 1-octene comonomer to give very low crystallinity, very low density, and low modulus. The product is made using a metallocene catalyst which is supposed to give novel molecular weight properties, and novel properties related to how the 1-octene is distributed among the various chains in the polymer product, the metallocene catalyst giving more homogeneous distribution than older generation catalysts.

In HDPE, the ethylene is added in a linear fashion, adding head to tail on the growing polymer, so that the resulting polymer chain is a straight linear molecule. Because the polymer is structurally very linear and uniform, it can readily crystallize, and as a result, HDPE has higher crystallinity levels, higher stiffness, and higher density than the other types of polyethylene. HDPE usually has a density of at least about 0.935 g/cm$^3$.

HDPE is often not as desirable as LLDPE because the final product often suffers from haze due to polyethylene crystallinity derived from the HDPE. However, adding low levels of HDPE may increase the stiffness of the final product. In particular, adding low levels (e.g., at least about 1 wt %) of HDPE to a blend polymer, such as polypropylene, accelerates the crystallization rate of the blend polymer when the HDPE is adequately dispersed into the blend polymer by effective mixing of the masterbatch and blend polymer. It appears that under fast cooling conditions the HDPE nucleates faster than the blend polymer and as the HDPE begins to crystallize it acts as a nucleator for subsequent crystallization of the blend polymer, as discussed in U.S. application Ser. No. 08/618,756 to KLOSIEWICZ, filed Mar. 20, 1996, entitled "Masterbatch Formulations for Polyolefin Applications", the disclosure of which is herein incorporated by reference in its entirety.

The density of HDPE is preferably at least about 0.935 g/cm$^3$, more preferably at least about 0.950 g/cm$^3$, and most preferably at least about 0.960 g/cm$^3$, with ranges of preferably about 0.935 to 0.970 g/cm$^3$, more preferably about 0.950 to 0.965 g/cm$^3$, and most preferably about 0.960 to 0.965 g/cm$^3$. In this regard, the highest density displays the fastest and most complete crystallization behavior. The % crystallinity of the HDPE increases with increasing density, and thus density is a coarse measure of the ability of the HDPE to initiate crystallization.

An example of HDPE is "Alathon M6580" HDPE available from Equistar Chemicals, Houston, Tex. Another effective HDPE for use in this invention is "Alathon H6611" HDPE also available from Equistar Chemicals, which HDPE has an MI of 11.0 dg/min and a density of 0.965 g/cm$^3$.

In LDPE, the polymer is branched. In the ethylene polymerization reaction, the growing polymer starts as a linear molecule, but during the polymerization process the active radical end where the polymer growth occurs "bites-back" on the molecule. In this back biting reaction, the end removes a hydrogen atom from the molecule such that the end becomes non-reactive, and the site further back on the chain where the hydrogen atom is removed becomes an active radical capable of adding ethylene and growing at that site. As a result, the polymer is branched, the polymer growth occurring in a linear manner until the back-biting reaction after which polymer growth then proceeds at the branch site formed further back on the polymer chain. Because the polymer is not perfectly linear, the level of crystallinity, density, and stiffness of the LDPE is lower than in HDPE.

LDPE is expected to function similar to LLDPE in the present invention such that LDPE is expected to have little effect on the final product. However, LDPE is more difficult to process because it does not exhibit the same rheology as LLDPE. In particular, LDPE is not available in as wide a range of molecular weight, melting point, and density grades as LLDPE.

An example of LDPE is "Chevron PE1017" LDPE, a 0.917 g/cm$^3$ grade with an MI of 7.0 dg/min, available from Chevron Chemical Company, Houston, Tex.

As noted above, the carrier polymer may include secondary carrier polymer which is selected to improve the overall compatibility of the masterbatch with the blend polymer. For example, when polypropylene is the blend polymer, an example of a preferred secondary polymer is propylene-ethylene random copolymer. Such propylene-ethylene random copolymers facilitate compatibility of masterbatches with polypropylene. For instance, the propylene-ethylene random copolymer may be an isotactic propylene-ethylene random copolymer with a density of from about 0.88 to 0.91 g/cm$^3$ as measured at 23° C. according to ASTM D-1505 and an MI of from about 2 to 15 dg/min as determined according to ASTM D-1238 (conditions at 230° C. and 2.16 kg). The propylene-ethylene random copolymers have an ethylene content of preferably about 1.5 to 8 wt %, more preferably about 2 to 5 wt %, and most preferably about 2.5 to 4.5 wt %. It should be noted that increasing the amount of ethylene reduces the melting point of the copolymer. As a result, propylene-ethylene random copolymers may melt like polyethylene which facilitates mixing with the resin, and yet be compatible with polypropylene which facilitates mixing of propylene-ethylene random copolymer containing masterbatches with polypropylene. The propylene-ethylene random copolymers may be synthesized by employing Ziegler-Natta catalysts such as TiCl$_3$.

Examples of propylene-ethylene random copolymers include "Solvay KB 4415" copolymer which is a propylene-ethylene random copolymer containing 2 wt % ethylene, i.e., 2 wt % C2, available from Solvay Polymers Inc., Houston, Tex.; and "Fina 7425" copolymer which is a propylene-ethylene random copolymer containing 3 wt % ethylene, i.e., 3 wt % C2, available from Fina Oil and Chemical Company, Dallas, Tex. This difference in ethylene content between "Solvay KB 4415" propylene-ethylene random copolymer and "Fina 7425" propylene-ethylene random copolymer translates into the "Fina 7425" propylene-ethylene random copolymer having a peak melting point of 145° C., about 10° C. lower than the peak melting point of the "Solvay KB 4415" propylene-ethylene random copolymer. Another example of a propylene-ethylene random copolymer is "Fina 8473" propylene-ethylene random copolymer containing 4.5 wt % ethylene, i.e., 4.5 wt % C2, having a melting point of 134° C., available from Fina Oil and Chemical Company, Dallas, Tex.

For example, the amount of LLDPE in masterbatches can be reduced by half when replaced with propylene-ethylene random copolymer while still retaining compounding efficiency. As a result, the LLDPE content in the masterbatch is further reduced. Thus, 3 component masterbatches (e.g., resin, LLDPE, and propylene-ethylene random copolymer) are often better modifiers than 2 component masterbatches (e.g., resin and LLDPE).

When the masterbatch is to be added to polypropylene blend polymer, the carrier polymer which is combined with resin is preferably at least semi-compatible with polypropylene. In this regard, the carrier polymer is preferably a polyolefin, more preferably an alpha polyolefin, and most preferably a straight chain alpha polyolefin derived from ethylene, propylene, 1-butene, 1-hexene, 1-octene, 1-decene, and mixtures thereof. When combined with polypropylene, the carrier polymer preferably does not form a separate phase when mixed with polypropylene. In other words, the carrier polymer preferably at least forms semi-compatible blends or quasi-homogeneous mixtures with polypropylene. In this regard, when combined with polypropylene blend polymer, the carrier polymer preferably has the hydrogen bonding index and solubility parameter as discussed above.

As discussed above, most polypropylene homopolymers have a peak melting temperature of about 165° C. The high peak melting temperature of polypropylene makes it difficult to mix polypropylene homopolymer with most resins. Further, the crystallization properties of polypropylene homopolymer make pelletization difficult. Polypropylene homopolymer, however, may be used in the masterbatches of the present invention as a secondary carrier polymer as long as the effect of the primary carrier polymer is not significantly affected. Because of processing difficulties, however, the carrier polymer is preferably a non-polypropylene polymer. Therefore, the masterbatch may consist essentially of no polypropylene homopolymer and may consist of no polypropylene homopolymer.

In addition, the masterbatch may include substantially any other component or additive. Examples of additives include stabilizers, slip additives, colorants, and nucleators.

The further components or additives, however, are preferably present at levels which do not significantly hinder the efficiency with which the resin and the carrier polymer (and possibly a secondary carrier polymer) can be processed into masterbatch.

The masterbatch components are preferably intimately combined utilizing techniques such as dry blending, extrusion mixing, and melt blending and pelletizing. In a preferred embodiment, the masterbatch is provided in pellet form by melt blending and pelletizing the masterbatch components. The masterbatch components may be compounded by using an extruder or a continuous mixer, with extruders being preferred.

To facilitate good mixing, the initial mixing of the present invention preferably occurs at a temperature near the R&B softening point of the resin. Preferably, the initial mixing occurs at a temperature within about 20° C. of the R&B softening point of the resin, more preferably within about 10° C. of the R&B softening point of the resin. Further, the initial mixing temperature is preferably within about 20° C. of the peak melting temperature of the carrier polymer. In this regard, the initial mixing temperature is particularly important because once the resin and the carrier polymer begin to mix, the viscosity of the carrier polymer is reduced such that the mixing becomes easier after the initial mixing.

These initial mixing temperatures facilitate good mixing because the viscosities of the carrier polymer and the resin are close to each other. During mixing, the resin preferably has a Brookfield viscosity greater than about 200 poise, more preferably greater than about 2000 poise, with ranges of preferably about 200 to 10,000 poise, more preferably about 500 to 6000 poise. In this application, Brookfield viscosity is measured in accordance with ASTM D-6267, using a speed to keep the viscosity measurement at midscale and by using a #7 spindle with a Model DV-II viscometer and Thernosel heating apparatus supplied by Brookfield Engineering Laboratories, Stoughton, Mass. The carrier polymer typically has a melt viscosity of greater than about 1000 poise, and more typically about 10,000 to 100,000 poise at a shear rate of 1000 $s^{-1}$ when the carrier polymer is in the molten state at 10° C. above the peak melting temperature of the carrier polymer. Polymer melt viscosity can be measured by using an instrument such as a capillary shear rheometer available from Goettfert, Rock Hill, S.C. Thus, the ratio of the viscosity of the molten carrier polymer to the viscosity of the resin at 10° C. above the peak melting temperature of the carrier polymer is preferably less than about 20 to 1, more preferably less than about 10 to 1.

The extrusion process of the present invention can be practiced in accordance with the extrusion process described in U.S. Pat. No. 5,213,744 to BOSSAERT, the disclosure of which is herein incorporated by reference in its entirety. However, it should also be noted that the screw configuration is preferably severe enough to promote a high degree of mixing in the extruder. In particular, the extruder preferably has cross-kneading elements along about 10 to 30% of the length of the extruder and preferably has back flow conveying elements, e.g., reverse pitch elements, forward of the cross-kneading elements which retain material for longer periods of time in the intensive mixing section where the cross-kneading elements are located. Thus, the mixing is preferably done at a shear rate in the range of about 50 to 1000 $sec^{-1}$, more preferably in the range of about 100 to 500 $sec^{-1}$. Shear rate during mixing in a compounding extruder is dependent on the geometry of the mixing element in the extruder as well as the rate of rotation (rpm) of the extruder screw during processing.

In this type of compounding equipment, the bulk of the melting and mixing energy is derived from mechanical energy imparted by the motor to the extruder screws. As the motor speed is increased, a greater amount of mechanical energy is put into the material, increasing the degree of mixing and increasing the temperature of the melt. The rate at which material is fed to the extruder may be controlled by an auger screw feeder. The extruder output equals the rate at which the ingredients are fed to the extruder feed throat. For any material feed rate to the extruder, the specific mixing energy per pound of compound is increased by increasing the extruder speed at a given feed rate. This technique is used for achieving the desired level of homogenization of a blend, or to control the ultimate melt temperature after compounding. A significant problem in compounding masterbatches containing high loadings of resin is that the specific energy required to compound and homogenize the materials may be so high that the melt temperature is elevated to a level where the melt viscosity is too low to cause efficient pelletization of the compounded product. As a result, some polymers can be compounded into masterbatches with high loadings of resin much easier than other polymers.

Because the present invention is directed to combinations of resin and carrier polymer which are easier to mix, not as much mechanical energy is needed to homogenize the masterbatch compositions of the present invention. In this regard, the compounding energy required for mixing to a visually homogeneous state, i.e., substantially homogeneous state, according to the present invention is preferably less than about 200 watt-hr/lb, more preferably less than about 100 watt-hr/lb, and most preferably less than about 70 watt-hr/b, with ranges of about 40 to 200 watt-hr/lb, more preferably about 40 to 100 watt-hr/lb, and most preferably about 40 to 70 watt-hr/lb.

Examples of extruders which may be used to compound the masterbatch include twin screw extruders such as the Davis-Standard 32 mm "D-Tex" twin screw extruder available from Davis-Standard Inc., Pawcatuck, Conn., and twin screw extruders available from Warner-Pfleiderer, Ramsey, N.J.

A remarkable advantage of the present invention is that the masterbatches may be compounded at fast rates. For instance, a 69 mm twin screw extruder with a 250 hp motor operating at 425 rpm may have a rated output of about 1200 to 2000 lb/hr depending upon the materials being processed. Typically, the output rate for making masterbatch with high resin loadings would be lower than this range because of the difficulty blending polymer and resin when there is a severe mismatch in viscosity during compounding which requires a high degree of mixing to achieve homogenization. In this regard, the masterbatch making process of the present invention can be carried out at the mechanical limits of the extruder and pelletizer. This advantage of the present invention is particularly important because high resin content masterbatch compositions outside the scope of the present invention generally cannot be processed at the mechanical limits of the extruder and the pelletizer. The known high resin content masterbatch compositions either cannot be mixed fast enough in the extruder or do not crystallize fast enough such that pelletizing slows the process.

The compounded product is usually pelletized by using a strand type pelletizer, underwater pelletizer, or water-ring pelletizer.

In strand pelletizers, the molten masterbatcb leaves the extruder in the form of strands which enter a cooling bath. After exiting the cooling bath, the strand of masterbatch enters a cutter. The cutter may involve a metal lip over which an end of the strand of masterbatch hangs until the end is cut off by a rotating blade.

In underwater pelletizers, the extrudate exits through holes in a die face which is underwater. Small bits or "drops" of extrudate are cut off by rotating knife blades which have knife edges in contact with the die face. In this regard, cooling water is circulated through a cooling chamber which encloses the die face and the knife blade such that water flows over the die face and the knife blade.

In water-ring pelletizers, the extrudate exits through die holes of a round die plate of the extruder. Small bits or "drops" of extrudate are cut off by rotating knife blades which have knife edges in contact with the die face. The molten extrudate "drops" are flung by the knife blade into a cylindrical curtain of water flowing downward around the circumference of the round die plate. When the extrudate hits the water the surface cools to form pellets which cool further as they flow down to a screen separator where most of the water is separated from the pellets. A preferred water-ring pelletizer is the "WRP-12V" water-ring pelletizer available from Berringer Division, Marblehead, Mass. During pelletization, the cutter speed is preferably greater than about 2000 rpm, more preferably about 3000 rpm. At slower speeds extrudate containing high levels of resin tends to stick to the blades more than when the blades rotate at higher speeds. The number of die holes is typically specified to provide extrusion rates of about 10 to 40 (lb/hr-die hole) and the die hole diameter is typically about 0.100 inch unless sized smaller or larger to suit the rheology of the material being processed.

Because of the cutting process of pelletization, once the molten masterbatch composition is formed into the shape of a pellet, the masterbatch composition preferably solidifies fast enough, as discussed in item (3) above, so that the pellets do not agglomerate.

After cutting, the pellets may be dried. For example, the pellets may be dewatered, e.g., by passing the pellets over a screen, and then further dried. Although other dryers may be used for the further drying, centrifugal dryers are commonly used on both water ring pelletizing equipment and also underwater pelletizing equipment. In vertical centrifugal dryers, the pellets are retained inside the dryer screen and the water exits through the screen. The centrifugal dryer usually includes angled blades on the interior of the dryer which strike the pellets as the dryer rotates. Thus, the centrifugal dryer exerts considerable impact forces on the pellets, and the pellets are preferably reasonably ductile to survive the dryer without being shattered into little pieces. Some masterbatches with high loading of resin are difficult to dry without fracture if the polymer of the masterbatch causes the pellets to be very brittle. Other polymers are easier to process because the pellet is more ductile as it passes through the dryer. Thus, the masterbatch composition preferably exhibits sufficient toughness after cooling so that the formed pellets do not shatter during the drying and packaging stage of making the masterbatch.

In view of the above, while it is important to achieve good melt homogeneity in the masterbatch extrudate, it is also necessary for the extrudate to exhibit the proper melt viscosity or melt strength exiting the die to make good pellets. In this regard, to form the molten masterbatch into the shape of a pellet, e.g., by cutting the molten masterbatch as it exits a die as discussed above, the molten masterbatch is preferably not too fluid for pelletizing. In particular, using polymers with low melt indices (or melt flow rates) increases melt viscosity and strength, but makes the physical mixing of the resin and carrier polymer more difficult and can also make the rheology of the compounded blend unsuitable for forming pellets. Further, once the molten masterbatch composition is formed into the shape of a pellet, the masterbatch composition preferably solidifies fast enough so that the pellets do not agglomerate. Also, the masterbatch composition preferably exhibits sufficient toughness after cooling so that the formed pellets do not shatter during the drying and packaging stage of making the masterbatch.

The present invention is also directed to modified polymer blend compositions which result from blending the ingredients of the masterbatch described above with a blend polymer, e.g., by using a twin-screw extruder. The resulting masterbatches may be used to make polymer blends, such as polyolefin blends.

The viscosities of the masterbatch and the blend polymer help to determine the efficiency with which the masterbatch is distributed into the blend polymer. The melt viscosity of the blend polymer is preferably no greater than 10 times the melt viscosity of the masterbatch at 10° C. above the peak melting temperature of the blend polymer. Melt viscosities can be measured using a capillary rheometer as described earlier.

The blend polymer to which the masterbatch is added may be, e.g., polypropylene, such as isotactic polypropylene, or polyethylene. In adhesive applications, the blend polymer may be, e.g., SBS (styrene-butadiene-styrene), SEBS (styrene-ethylene-butadiene-styrene), SIS (styrene-isoprene-styrene), low crystallinity LDPE, ethylene copolymers such as EVA (ethyl-vinylacetate), and low crystallinity LLDPE.

Examples of preferred polypropylenes for use as the blend polymer include "Aristech FF020T" polypropylene homopolymer available from Aristech Chemical Corp., Pittsburgh, Pa.; "Borealis HD60IF" polypropylene homopolymer available from Borealis, Copenhagen, Denmark; and "Escorene 4292" polypropylene available from Exxon Chemical Houston, Tex.

In film applications, the masterbatch is preferably added to the polymer blend at about 2 to 30 wt %, more preferably about 4 to 20 wt %, and more preferably about 5 to 15 wt %. In adhesive applications, the masterbatch is preferably added to the polymer blend at about 12.5 to 75 wt %, more preferably about 25 to 62.5 wt %, and most preferably about 37.5 to 62.5 wt %.

The resin is preferably incorporated in the polymer blend at about 2 to 25 wt %, more preferably about 3 to 20 wt %, and most preferably about 4 to 15 wt %. In cast polypropylene films, resin is preferably added in the polymer blend at about 3 to 8 wt %. In oriented polypropylene films, resin is preferably added in the polymer blend at about 3 to 20 wt %, depending on the desired properties. In adhesives, the resin is preferably incorporated in the polymer blend at about 10 to 60 wt %, more preferably about 20 to 50 wt %, and most preferably about 30 to 50 wt %.

In film applications, the carrier polymer is preferably incorporated in the polymer blend at levels less than about 5 wt %, more preferably less than about 3 wt %, and most preferably less than about 2 wt %.

The polymer blend may then be used to form a final or finished product. The finished product may be made from ranges of polymer blend compositions containing resin which exhibit enhanced mechanical and optical properties. The blend may be converted directly to the final or finished product by mixing the masterbatch with the blend polymer during extrusion to produce the final product. Examples of the finished product include films, fibers, molded goods, and adhesives. For instance, the finished product may be an oriented polypropylene film.

As discussed above, adding resin masterbatches to blend polymer results in modified properties in the final product. In film applications, these modified properties include increased gloss, reduced haze, increased stiffness, improved barrier properties, improved processing during orientation, and improved shrink properties.

Optical properties such as haze and gloss are very dependant on film thickness, film processing procedure, polymer crystallization characteristics, and the presence of incompatible or partly compatible additives. In general, films of the present invention preferably exhibit gloss values equal or greater than values for films made without resin masterbatch, having gloss values typically greater than about 80%, more preferably greater than about 90%, and most preferably greater than about 95%.

Similarly, film haze is dependant on a number or factors. The films preferably have a haze of about 5%, more preferably less than about 3%, and most preferably less than about 1.5% as measured using a Haze-Gard tester manufactured by Byk-Gardner, Columbia, Maryland. It was expected that the use of polyethylene as the carrier polymer in masterbatches for production of polypropylene films would increase haze. It was, however, unexpectedly found that excessive haze is not a problem if the level of polyethylene in the masterbatch is minimized by achieving a level of at least about 75 wt % of resin in the masterbatch.

Film stiffness is very dependant on the polymer type and process used to make the film. In one application the masterbatch of the present invention can be used to modify oriented polypropylene (OPP) film, in which case the films preferably have a tensile modulus of about 250 to 500 psi, more preferably about 300 to 500 psi, and most preferably about 350 to 500 psi.

These OPP films preferably have a moisture vapor transmission rate, as measured in accordance with ASTM E96, of less than about 4.5 ( g. H2O-mil / day- m$^2$), more preferably less than about 4.0 ( g. H20-mil day- m$^2$), and most preferably less than about 3.0 (g. H2O-mil/day- m$^2$).

Regarding characteristics other than optical quality, the use of LLDPE, as opposed to polypropylene, in masterbatches does not significantly affect the characteristics of polypropylene articles. Because LLDPE does not significantly alter the properties of the final article in comparison with polypropylene, LLDPE is a preferred polyethylene for polypropylene articles. LDPE is also expected to not significantly affect the characteristics of polypropylene articles.

In contrast to adding LLDPE and LDPE, adding a masterbatch containing HDPE and resin to polypropylene homopolymer prior to extrusion of the article results in modified characteristics in the final article. For example, the addition of low levels of resin and HDPE increases the tensile modulus value of the polypropylene blend by 15% to 70% above the value of the polypropylene itself. More typically, increases of 20% to 50% are achieved by this modification. A principal, but not exclusive, use for formulations of this type is in cast film where higher stiffness is a desirable quality.

The present invention will be further illustrated by way of the following Examples. These examples are non-limiting and do not restrict the scope of the invention.

Unless stated otherwise, all percentages, parts, etc. presented in the examples are by weight.

EXAMPLE 1 AND COMPARATIVE EXAMPLE 1

This Example involves a masterbatch formed of resin and polyethylene, and this Comparative Example involves a masterbatch formed of resin and polypropylene. This Example shows that the masterbatch of the present invention can be made using strand pelletization with similar or better efficiency than the masterbatch of the Comparative Example formed of 45 wt % resin and 55 wt % polypropylene.

Example 1 has a masterbatch composition of 78 wt % "Res A-2468™" resin, a hydrogenated DCPD resin, available from Hercules Incorporated, Wilmington, Del., and 22 wt % "DSM 1016" LLDPE available from DSM, Geleen, the Netherlands. Example 1 was compounded using a 32 mm Davis-Standard "D-Tex" twin screw extruder with a $^{36}\!/\!_1$ L/D ratio (ratio of screw length to screw diameter) and 15 hp motor, available from Davis-Standard Inc., Pawcatuck, Conn. The screw configuration was very severe to promote a high degree of mixing in the extruder. In particular, this was accomplished by utilizing kneading elements in the screw design along with back flow conveying elements forward of the kneading elements which retain material for longer periods of time in the intensive mixing section where the kneading blocks are located.

The resin and LLDPE were added to the extruder at a rate of 55 lb/hr for the resin and at a rate of about 15 lb/hr for the LLDPE. The ingredients were used as received from the manufacturers and the resin and polymer were continuously proportioned and dry blended using a Model 222 weigh scale blender manufactured by Maguire Products, Aston, Pa. The blend [resin+carrier polymer] was metered into the feed throat of the compounding extruder using a Model MSF auger feeder made by Maguire Products at a nominal rate about 70 lb/hr. The material was extruded using extruder barrel temperatures in the range of 250° F. to 280° F. The molten blend was extruded at a 320 rpm extruder speed through a die having (4) 0.100 inch diameter holes. The temperature of the melt was measured to be about 300° F., and the die pressure was low, less than 100 psi. The melt was extruded into 4 strands which were cooled in a 10 foot long water bath prior to pelletization by a 3" strand pelletizer available from Wayne Machine and Die Co., Totowa, N.J.

The results demonstrated that homogeneous, clear pellets were efficiently produced at a very good rate of 70 lb/hr, using less than 10 feet of cooling bath length to cool the strands to a solid state that pelletized easily. The masterbatch could have been compounded at higher rates by using a longer cooling bath to provide the same cooling time at faster draw speeds. Thus, 55 lb/hr of resin was compounded into masterbatch form.

Comparative Example 1 involves a masterbatch having 45 wt % "Res A-2468™" resin in 55 wt % "Montell PDC 1120" polypropylene, available from Montell Polymers, Wilmington, Del., using the same Davis-Standard twin screw extruder and auxiliary equipment as in Example 1. The feed rate of the resin was 27 lb/hr and the feed rate of the polypropylene was 33 lb/hr. In this Comparative Example the extruder barrel temperature was set at 350° F. to 360° F. to accommodate the higher melting polypropylene. The blend was compounded using a 325 rpm extruder speed and the final melt temperature was about 380° F. with a die pressure of about 100 psi. The same 10 foot cooling bath was used as in Example 1, except in Comparative Example 1, the strand was double passed through the water bath to provide an extra 5 feet of cooling length in the water bath in addition to an extra 10 feet of cooling length in air. Using the same equipment used in Example 1, the masterbatch of Comparative Example 1 could only be made at 60 lb/hr with about 50% more cooling time than required in Example 1. The cooling time of Comparative Example I was increased by increasing the strand length from extruder to pelletizer by 50% relative to Example 1. Thus, the rate at which resin was compounded was 27 lb/hr, or about half the rate of Example 1. When the masterbatch composition of Comparative Example 1 was extruded at faster rates, the strands remained soft and stretchy and did not cut well, and jammed the pelletizer. The strand solidified even slower at 50 wt % resin level.

In view of the above, the masterbatch of the present invention can be made using strand pelletization with similar or better efficiency than a comparable masterbatch formed of 45 wt % resin and 55 wt % polypropylene.

EXAMPLES 2–8

These Examples involve masterbatches including "Res A-2468™" resin available from Hercules Incorporated, Wilmington, Del. The masterbatches also included polyethylene and/or propylene-ethylene random copolymer.

In these Examples, "Res A-2468™" resin, a hydrogenated DCPD resin, was compounded at an 80 wt % level with the remainder being another polymer. The other polymer was LLDPE, propylene-ethylene random copolymer, or a combination of LLDPE and propylene-ethylene random copolymer, as listed in Table 1 below.

In Table 1, "Montell 12C01" is an LLDPE having an MI of 1.0 dg/min, available from Equistar Chemicals, Houston, Tex. "Dowlex 2035" is an LLDPE having an MI of 6.0 dg/min, available from Dow Chemical, Midland, Mich. "Solvay KB 4415" is a propylene-ethylene random copolymer containing 2 wt % ethylene, i.e., 2 wt % C2, available from Solvay Polymers Inc., Houston, Tex. "Fina 7425" is a propylene-ethylene random copolymer containing 3 wt % ethylene, i.e., 3 wt % C2, available from Fina Oil and Chemical Company, Dallas, Tex. The difference in ethylene content between "Solvay KB 4415" propylene-ethylene random copolymer and "Fina 7425" propylene-ethylene random copolymer translates into the "Fina 7425" propylene-ethylene random copolymer having a peak melting point of 145° C., about 10° C. lower than the peak melting point of the "Solvay KB 4415" propylene-ethylene random copolymer.

TABLE 1

| Ex. | Polyethylene | Propylene-ethylene copolymer | PP Type |
|---|---|---|---|
| 2 | 20 wt % "Montell 12C01" | | |
| 3 | 20 wt % "Dowlex 2035" | | |
| 4 | 12 wt % "Dowlex 2035" | 8 wt % "Solvay KB 4415" | 2% C2 |
| 5 | 12 wt % "Dowlex 2035" | 8 wt % "Fina 7425" | 3% C2 |
| 6 | 14 wt % "Dowlex 2035" | 6 wt % "Fina 7425" | 3% C2 |
| 7 | | 20 wt % "Solvay KB 4415" | 2% C2 |
| 8 | | 20 wt % "Fina 7425" | 3% C2 |

Masterbatch pellets were made from these compositions by passing the resin and the carrier polymer into a Davis-Standard 32 mm "D-Tex" co-rotating twin screw extruder as described in Example 1. The rate at which the resin and carrier polymer enter the extruder can be calculated from the information in Table 2 below. For instance, in Example 2, the total feed rate is 82 lb/hr which means that to make the 80 wt % resin and 20 wt % polyethylene masterbatch, the resin is added at a rate of about 66 lb/hr and the polyethylene is added at a rate of about 16 lb/hr to the extruder which compounds the blend. The same compounding equipment was used as in Example 1. The [resin+carrier polymer] blends were mixed in the correct proportions using a Maguire Model 222 weigh scale blender as in Example 1, and the rate at which this blend was fed to the extruder was controlled by a Maguire auger feeder through an extruder and a water-ring pelletizer as described below.

The Davis-Standard 32 mm "D-Tex" twin screw extruder had a water-ring pelletizer die with (4) 0.100 inch diameter holes. The extruder had a 36/1 L/D ratio (ratio of screw length to screw diameter). The screw configuration was very severe to promote a high degree of mixing in the extruder. In particular, this was accomplished by utilizing kneading elements in the screw design along with back flow conveying elements forward of the kneading elements which retain material for longer periods of time in the intensive mixing section where the kneading blocks are located.

The extruder had 11 barrel temperature zones, set to the following temperatures: Z1 =120° F., Z2=230° F., Z3=320° F., Z4=320° F., Z5=300° F., Z6=285° F., Z7=275° F., Z8=225° F., Z9=225° F., Z10=225° F., and Z11=225° F. The extruder also had the following temperature set points: Adaptor=300° F., Die (top)=335° F., and Die (bottom)=300° F.

The extruder speed for each of the Examples was set as listed in Table 2, below. In this regard, the extruder speed was set at the minimum practical speed needed to compound the materials into a homogeneous state to minimize the final melt temperature and maximize the melt viscosity. It should be noted that it is difficult to pelletize materials having very low melt viscosity using a water-ring pelletizer. As seen from Table 2, the feed rate, i.e., the extruder speed, was maintained at about 80 lb/hr for most of the Examples. In Example 6 the pellets going through the dryer were slightly too brittle and the feed rate was increased by about 20% to increase the pellet size by 20%, which in turn caused the pellets to be slightly warmer and less brittle in the dryer.

The compounded product was pelletized using a "WRP-12V" water ring pelletizer available from Berringer Division, Marblehead, Mass. The extrudate exited through the 4 die holes (i.e., at a rate of about 20 lb/hr/hole for most of the Examples) and small bits or "drops" of extrudate were cut off by (2) rotating knife blades which had knife edges in contact with the die face. The cutter speed was maintained at a maximum speed of about 3000 rpm. The pellets were cooled in a flowing stream of water, and then dewatered by a combination of screen separation of water followed by centrifugal drying. The dryer portion of the pelletizer was operated in the standard condition as supplied by Berringer.

As shown in Table 2, the size of the pellets was measured for all of the Examples where pelletized product could be made. In Table 2, prills refers to spherical particles or rounded balls which may be formed by an agglomeration of particles. At an extrusion output of 80 lb/hr with the cutter rotating at 3000 rpm, a pellet size of 40 pellets per gram indicates that all die holes are open. Examples 3 and 6 had a smaller pellet size because one of the 4 holes was blocked.

TABLE 2

| Ex. | Feeder Setting | Rate (lb/hr) | Cutter Speed (rpm) | Extruder Speed (rpm) | Motor Load (%) | Die Pressure (psi) | Pellet Size (Pellet/g) | Pellet Quality |
|---|---|---|---|---|---|---|---|---|
| 2 | 25 | 82 | 3000 | 225 | 73 | 210 | 40 | good |
| 3 | 25 | 82 | 3000 | 180 | 75 | 140 | 30 | good |
| 4 | 25 | 81 | 3000 | 225 | 71 | 360 | — | poor |
| 5 | 25 | 82 | 3000 | 180 | 70 | 200 | 41 | good |
| 6 | 32 | 100 | 3000 | 210 | 75 | 230 | 32 | good |
| 7 | 25 | 79 | 3000 | 260 | 69 | 200 | — | poor |
| 8 | 25 | 83 | 3000 | 215 | 71 | 190 | — | poor |

Table 3 below describes the materials collected from the Berringer pelletizer. In several of the Examples, the characteristics of the masterbatch extrudate were not satisfactory for making pellets, and for this reason acceptable masterbatch product with proper pellet appearance could not be made, as seen in Table 3.

TABLE 3

| Example | Pellet Appearance and Quality | Processability |
|---|---|---|
| 2 | Thin plate like pellets with round shape, clear, 40 pellets/gram; no agglomerates, some multiple pellets. Very good pellets. | Excellent |
| 3 | Round, clear, pill shaped pellets, 30 pellets/gram; 30% thicker than Example 6; No agglomerates, no multiples, no fracture and little fines. Excellent pellets. | Excellent |
| 4 | A fraction of materials was pellets with hazy appearance; many agglomerated prills, ¼" to ½" in size, lots of small fractured material. Poor pelletization. | Poor |
| 5 | Mostly out of round, hazy, flat shaped pellets, 41 pellets/gram; small amount of multiples, fairly large amount of fracture material. Fair-good pellets except for fractured pellets and fines. | Good |
| 6 | Small, flat, round, slightly hazy, regular shaped pellets, 32 pellets/gram; very little pellet fracture or fines. Very good-excellent quality pellet. | Excellent |
| 7 | Very little of material had pellet like shape, was fairly clear; mostly large agglomerated prills, ¼" to ½" in size, large amount of fractured fines also. Very poor pelletization. | Very Poor |
| 8 | Mostly out of round, pellet like material, numerous multiples and agglomerates present, also stringy material; very irregular shaped pellets | Fair |

From Table 3, it is apparent that masterbatches containing "Res A-2468™" resin and "Solvay KB 4415" propylene-ethylene random copolymer processed more poorly both as a two component blend (Example 7) and in combination with "Dowlex 2035" LLDPE (Example 4) than similar masterbatches where "Fina 7425" propylene-ethylene copolymer was used in place of the Solvay copolymer (Examples 5, 6, and 8). The better processabilty of the "Fina 7425" propylene-ethylene random copolymer is related to this copolymer melting and becoming plastic at a lower temperature where the molten resin itself has a higher viscosity. As discussed above, the resin can be homogenized with the carrier polymer more efficiently if the initial mixing of the ingredients can be caused to occur at lower temperatures where the resin still retains a high melt viscosity and more elastic characteristics.

Still referring to Table 3, because of the lower crystalline melting point of the LLDPE, both the "Montell 12C01" LLDPE having an MI of 1.0 dg/min (Example 2) and "Dowlex 2035" LLDPE having an MI of 6.0 dg/min (Examples 3–6) were easily and effectively compounded and homogenized into "Res A-2468™" resin at an 80 wt % resin loading. It was observed that it was actually easier to accomplish the physical mixing of the ingredients in the extruder using the higher melt index "Dowlex 2035" LLDPE. However, the resulting extrudates which included the "Dowlex 2035" LLDPE had a lower melt viscosity and less melt strength. As a result, it was more difficult to form into pellets unless the temperature of the final extrudate was controlled and minimized by controlling the extruder temperature set points and by controlling the extruder speed, as was done in Example 3. In contrast, when "Montell 12C01" LLDPE was included in the masterbatch, the pellet forming step is easier because of the higher melt viscosity of the compound having "Montell 12C01" LLDPE (Example 2).

From these Examples, it is clear that when preparing masterbatches containing high levels of resin in a highly effective manner, the following factors are important:

(1) poor homogenization of the resin with the carrier polymer leads to the formation of large agglomerates or prills of extrudate rather than pellets (also, when high melt temperatures are needed to homogenize the carrier polymer and resin, it is difficult to form good pellets because of the reduced melt strength of the molten blend);

(2) reducing the melting point of the carrier polymer compounded with the resin makes it easier to physically melt and mix the carrier polymer and resin because the carrier polymer plasticates at temperatures where the resin has a higher melt viscosity; and (3) at the same melting point, increasing the melt index (or melt flow rate) of the carrier polymer improves the efficiency with which the carrier polymer can be homogenized with the resin.

In particular, masterbatches containing 80 wt % "Res A-2468™" resin were produced very effectively when the following carrier polymers were also used in the masterbatch:

(1) "Montell 12C01" LLDPE;

(2) "Dowlex 2035" LLDPE;

(3) 14 wt % "Dowlex 2035" LLDPE and 6 wt % "Fina 7425" propylene-ethylene random copolymer (as the amount of "Fina 7425" propylene-ethylene random copolymer was increased and the "Dowlex 2035" LLDPE level reduced, processing became more difficult).

In contrast, acceptable pelletized masterbatch materials containing 80 wt % "Res A-2468™" resin were not made using the following carrier polymers:

(1) "Solvay KB 4415" propylene-ethylene random copolymer; and (2) "Fina 7425" propylene-ethylene random copolymer.

In general, these Examples show that masterbatches containing high levels of "Res A-2468™" resin can be efficiently made using LLDPE or LLDPE in combination with a lesser amount of certain propylene-ethylene random copolymers. It was not possible under similar conditions to efficiently make high resin content masterbatches with good blend homogeneity or good pellet quality using polypropylene homopolymer per se or for many propylene-ethylene random copolymers per se. The difficulty is due to the higher melting point of these carrier polymers, as well as the rheology and crystallization characteristics of masterbatches containing low levels of propylene polymers with "Res A-2468™" resin.

COMPARATIVE EXAMPLE 2

This Comparative Example involves making resin and polypropylene homopolymer masterbatches in the same manner as in Examples 2–8, except as noted below. In particular, this Comparative Example involves switching from one polypropylene homopolymer to another polypropylene homopolymer during the compounding.

A masterbatch was formed from 80 wt % "Res A-2468™" resin available from Hercules Incorporated, Wilmington, Del., and 20 wt % "Aristech FF020T" polypropylene homopolymer having a MFR (ASTM D-1238, 230° C./2.16 kg load) of 2.0 dg/min, available from Aristech Chemical Corp., Pittsburgh, Pa. The compounding extruder and auxiliary blending equipment were the same as in Example 1. In this Comparative Example the extruder barrel temperatures were set at 330° F. to 340° F. at the feed end of the extruder to promote melting of the material, but reduced to 280° F. to 300° F. at the die end to keep the temperature of the melt exiting the die as low as possible to facilitate pelletizing.

The extruder was set at 310 rpm to promote intensive mixing of the resin and carrier polymer and the [resin+carrier polymer] blend was fed to the extruder at 75 lb/hr. The higher extruder speed was required to provide the mixing energy needed to melt and homogenize the blend compared with the extruder speed of Examples 2–8. The resulting extrudate was not effectively cut into pellet like particles by the Berringer pelletizer. Instead, large lumps and prills were formed, some of which were large enough to partially jam the cutter and dryer motors of the Berringer pelletizer.

When the feed was changed to 80 wt % "Res A-2468™" resin and 20 wt % "Borealis HD601F" polypropylene homopolymer, a cast film grade polypropylene having a MFR (ASTM D-1238, 230° C./2.16 kg load) of 8.0 dg/min, available from Borealis, Copenhagen, Denmark, the problem of large chunks and prills of extrudate quickly disappeared. The feed composition was changed by substituting the Borealis polymer for the Aristech polymer in the feed hopper of the Maguire blender. The feed including the Borealis polymer, however, did not produce good results, but instead produced finer, irregular, granular shaped pieces of solidified extrudate, rather than large chunks and prills as with the initial feed.

The high melting point of the homopolymer hindered effective homogenization of the resin with polypropylene, even when using high extruder speeds to promote mixing. However, when "Borealis HD601F" polypropylene homopolymer having a higher MFR was used, the degree of homogenization achieved during compounding was improved and the rheology of the blend became more suitable for making pellets. As a result, the problem of large agglomerates and prills, attributed to poor homogenization and improper extrudate rheology, was reduced. However, this latter blend was so brittle and friable after cooling that the masterbatch pellets were readily granulated during drying and handling.

In view of the above, acceptable pelletized masterbatch materials containing 80 wt % "Res A-2468™" resin could not be made using either "Aristech FF020T" polypropylene homopolymer or "Borealis HD601F".

EXAMPLES 9–12 AND COMPARATIVE EXAMPLE 3

These Examples involve masterbatches formed from "MBG 273™" resin available from Hercules Incorporated, Wilmington, Del. The masterbatches also include polyethylene and/or propylene-ethylene random copolymer.

In these Examples, "MBG 273™" resin was compounded at an 80 wt % level with the remainder being another polymer. The other polymer was LLDPE, propylene-ethylene random copolymer, or a combination of LLDPE and propylene-ethylene random copolymer, as listed in Table 4 below.

TABLE 4

| Ex. | Polyethylene | Propylene | PP Type |
|---|---|---|---|
| 9 | 20 wt % "Montell 12C01" | | |
| 10 | 20 wt % "Dowlex 2035" | | |
| 11 | 13 wt % "Dowlex 2035" | 7 wt % "Fina 7425" | 3% C2 |
| 12 | | 20 wt % "Fina 7425" | 3% C2 |
| Comp. 3 | | 20 wt % "Borealis HD601F" | homo-polymer |

Referring to Table 4 above, "Montell 12C01" is a LLDPE having an MI of 1.0 dg/min, available from Montell Incorporated, Wilmington, Del. "Dowlex 2035" is a LLDPE having an MI of 6.0 dg/min, available from Dow Chemical, Midland, Mich. "Solvay KB 4415" is a random propylene-ethylene random copolymer containing 2% ethylene, i.e., 2% C2, available from Solvay Polymers Inc., Houston, Tex. "Fina 7425" is a random propylene-ethylene random copolymer containing 3% ethylene, i.e., 3% C2, available from Fina Oil and Chemical Company, Dallas, Tex. As noted above, "Borealis HD601F" polypropylene homopolymer is a cast film grade polypropylene having a MFR (ASTM D-1238, 230° C./2.16 kg load) of 8.0 dg/min, available from Borealis, Copenhagen, Denmark.

Masterbatch pellets were made from these compositions by passing the resin and the carrier polymer through the extruder and water ring pelletizer used in Examples 2–8 in the same manner as in Examples 2–8, except as noted below. The rate at which the resin and carrier polymer were added to the extruder can be calculated from the information in Table 5 below. For instance, in Example 9, the total feed rate is 86 lb/hr which means that to make the 80 wt % resin and 20 wt % polyethylene masterbatch, the resin is added at a rate of about 69 lb/hr and the polyethylene is added at a rate of about 17 lb/hr. The mixture [resin+carrier polymer] at the correct proportions was made using a Maguire Model 222 weigh scale blender, and the blend was fed to the extruder at the desired rate using a Maguire auger feeder as in Example 1.

The extruder had 11 barrel temperature zones in combination with the pelletizer temperature zones, set to the following temperatures: Z1=110° F., Z2=230° F., Z3=320° F., Z4=320° F., Z5=280° F., Z6=280° F., Z7=270° F., Z8=250° F., Z9=250° F., Z10=250° F., Z11=250° F., Adaptor=310° F., Die (top)=335° F., and Die (bottom)=330° F.

The extruder speed for each of the Examples and Comparative Examples was set as listed in Table 5, below. The water ring pelletizer was operated under standard conditions using (4) 0.100 inch diameter die holes and (2) cutter blades rotating at the speed indicated. Table 5 also lists the measured size of the pellets for all of the Examples where pelletized product could be made. In Table 5, prills refers to spherical particles or rounded balls which may be formed by an agglomeration of particles.

TABLE 5

| Ex. | Feeder Setting | Rate (lb/hr) | Cutter Speed (rpm) | Extruder (rpm) | Motor Load (%) | Die Pressure (psi) | Pellet Size (Pellet/gram) |
|---|---|---|---|---|---|---|---|
| 9 | 25 | 86 | 3000 | 270 | 78 | 220 | 36 |
| 10 | 25 | 87 | 3000 | 240 | 74 | 135 | 38 |
| 11 | 30 | 108 | 3000 | 270 | 77 | 200 | 32 |

TABLE 5-continued

| Ex. | Feeder Setting | Rate (lb/hr) | Cutter Speed (rpm) | Extruder (rpm) | Motor Load (%) | Die Pressure (psi) | Pellet Size (Pellet/gram) |
|---|---|---|---|---|---|---|---|
| 12 | 30 | 90 | 3000 | 240 | 76 | 130 | prills |
| Comp. 3 | 30 | 80 | 3000 | 280 | 77 | 170 | fines |

Table 6 below describes the materials collected from the Berringer pelletizer. In several of the Examples, the characteristics of the masterbatch extrudate were not satisfactory for making pellets, and for this reason acceptable masterbatch product with proper pellet appearance was not made, as seen in Table 6.

TABLE 6

| Example | Pellet Appearance and Quality | Processability |
|---|---|---|
| 9 | Small, out of round, slightly hazy, lens shaped pellet, 36 pellets/gram; minor amount of fracture and fines, no agglomerates. Very good quality pellets. | Excellent |
| 10 | Small, slightly hazy, cylindrical pellets, 38 pellets/gram; no agglomerates, very minor amount of fracture and fines. Very good quality pellets, had peculiar cylinder shape. | Very Good |
| 11 | Small, clear, out of round, flat lens shaped pellets; no agglomeration and minimal amount of fracture and fines. Excellent quality pellet. | Excellent |
| 12 | Chunks and agglomerates ¼" to ½" in size, lots of string like material, agglomerates, prills, and fines; almost none of the material resembled pellets. Very poor pelletization. | Very Poor |
| Comp. 3 | Material in water bath was clear, roundish, irregular shaped spheres, mostly multiple sphere like pellets; material was totally granulated in the dryer and came out as granulated dust and fines. Very poor pelletization. | Poor |

From Table 6, it is apparent that both LLDPE polymers (Examples 9–10) compounded very effectively with "MBG 273™" resin and produced good pellets. In Example 9 involving the lower melt index "Montell 12C01" LLDPE, the pellet shape was typically a flat pill shape. The pellets made from "Dowlex 2035" LLDPE (Example 10) had a different shape. In particular, with "Dowlex 2035" LLDPE, little swell of the masterbatch extrudate occurred upon leaving the die, resulting in cylindrical pellets with the cylindrical diameter being not much larger than the die hole diameter.

In Example 11, blending of "Fina 7425" propylene-ethylene random copolymer with "Dowlex 2035" LLDPE, resulted in a well homogenized product which produced an excellent clear pellet with typically a thin, round lens shape. The combination of polymers changed the rheology of the blend so that the extrudate swell increased significantly relative to Example 10, yielding the flat lens shape rather than a cylindrical shape. The clarity of the pellets indicated good homogeneity.

In Example 12, the incorporation of 20 wt % "Fina 7425" propylene-ethylene random copolymer gave poor processing, forming fines and prills rather than pellets. It was expected that the low melting "Fina 7425" propylene-ethylene random copolymer would homogeneously blend with the resin, as in Example 11. However, the 80/20 wt % extrudate of Example 12 did not have the right rheology to form pellets. The rheology of the extrudate caused the material to agglomerate immediately after exiting the die.

In Comparative Example 3, "MBG 273™" resin was compounded with "Borealis HD601F" polypropylene homopolymer. Masterbatch made from this high melt flow rate polypropylene homopolymer did not form large agglomerates, and appeared to be homogenized as evidenced by the clear appearance of the extruded material in the water stream before it entered the centrifugal dryer of the Berringer pelletizer. The material was composed mostly of interconnected multiple bits of irregular shaped spheres or granules. The material was so brittle that it was granulated to dust as it passed through the centrifugal dryer.

From these Examples and Comparative Examples, the following observations were made regarding masterbatches made from "MBG 273™" resin:

(1) masterbatches with LLDPE processed well but pelletization was not ideal;

(2) blends of LLDPE and propylene-ethylene random copolymer processed better than LLDPE alone, and the resulting product was clearer, indicating better compatibility between the resin and carrier polymer than the cases with LLDPE alone; and (3) blends of "MBG 273™" resin with polypropylene homopolymer or propylene-ethylene random copolymer could not be formed into pellets. However, these carrier polymers were more compatible with, and easier to physically mix with "MBG 273™" resin than with "Res A-2468™" resin. Compounding problems were more related to the difficulty of making pellets due to the rheology and crystallization characteristics of the extrudate.

EXAMPLES 13–15 AND COMPARATIVE EXAMPLES 4–7

These Examples and Comparative Examples show the difference in cooling times required for various masterbatch compositions. As noted above, fast cooling rates facilitate pelletization of the masterbatches by facilitating cutting.

The resin and carrier polymers listed in Table 7 were blended by adding these compositions to a Model D-6 counter-rotating twin screw extruder made by C. W. Brabender Instruments, Inc., S. Hackensack, N.J. This extruder is a small lab scale model, and the amount of materials processed in these Examples was small enough that the ingredients for each test were pre-mixed, and the blended mix was fed to the extruder. The resin and carrier polymer were fed to the extruder at the same rate at which the material was extruded, as indicated in Table 7.

The extruder speed for each of the Examples was set as listed in Table 7, below. The speed was varied to utilize the minimum speed needed to form a homogeneous extrudate. Extruder zone temperatures were nominally 120° C. (feed)/175° C. (mid)/190° C. (die). Temperatures were lowered 10° C. to 20° C. when needed to improve the melt strength of the extruded strands.

The extrudate at a temperature of about 200° C. entered a 60 cm long water bath at a temperature of about 25° C. to form a masterbatch strand having the diameter listed in Table 7. The composition was drawn at the speed listed in Table 7 by using the pelletizer of Example 1 and Comparative Example 1.

Referring to Table 7, "2468" refers to "Res A-2468™" resin, "FF020T" refers to "FF020T" polypropylene available from Aristech Chemical Corp., Pittsburgh, Pa., "Dow 2035" refers to "Dowlex 2035" LLDPE available from Dow Chemical, Midland, Mich., "M6580" refers to "Alathon M6580" HDPE available from Lyondell Polymers Corp., Houston, Tex., and "Fina 8473" refers to "Fina 8473" propylene-ethylene random copolymer available from Fina Oil and Chemical Company, Dallas, Tex. In these Examples the pelletizer speed setting was held constant, while the measured draw rate of the strands varied slightly due to minor stretching of the strands under tension.

times than masterbatch compositions including 35 wt % polypropylene or 55 wt % polypropylene.

EXAMPLES 16–18 AND COMPARATIVE EXAMPLES 8–9

These Examples and Comparative Examples involve making cast films based on "Union Carbide DX5E98" polypropylene available from Union Carbide Corp., Danbury, Conn. In one of the Comparative Examples, no resin was added to the film. The other Comparative Example and the Examples involve cast films modified with "Res A-2468™" resin, where the resin was incorporated by the

TABLE 7

| Example | Resin | Polymer | Extrusion Rate (kg/hr) | Extruder speed (RPM) | Pelletizer Speed Setting | Measured Draw Rate (cm/s) | Nominal Strand Diameter (Inch) |
|---|---|---|---|---|---|---|---|
| Comp. 4 | 50 wt % 2468 | 50 wt % FF020T PP | 2.3 | 100 | 46 | 16 | 0.055 |
| Comp. 5 | 65 wt % 2468 | 35 wt % FF020T PP | 2.0 | 100 | 46 | 17 | 0.055–0.060 |
| 13 | 65 wt % 2468 | 35 wt % Dow 2035 | 2.5 | 75 | 46 | 14.5 | 0.060 |
| 14 | 65 wt % 2468 | 35 wt % M6580 | 2.1 | 75 | 46 | 14 | 0.055 |
| Comp. 6 | 50 wt % MBG273 | 50 wt % FF020T PP | 2.3 | 80 | 46 | 15 | 0.055–0.060 |
| Comp. 7 | 65 wt % MBG273 | 35 wt % FF020T PP | 2.4 | 85 | 46 | 15.5 | 0.060 |
| 15 | 65 wt % MBG273 | 20 wt % Dow 2035 + 15 wt % Fina 8473 | 2.5 | 100 | 46 | 15 | 0.052 |

Table 8 below characterizes the extrudate, the strand, and how much cooling was necessary to solidify the masterbatch compositions. The extrudate appearance was characterized before the extrudate entered the water bath. The strand appearance was characterized after the extrudate exited the water bath.

To characterize whether the masterbatch strand had solidified, 5 $lb_f$ of force was applied at different times during the process. If the masterbatch strand stretched less than 5% when the 5 $lb_f$ was applied, the masterbatch strand was considered to have become rigid. If the masterbatch strand stretched more than 5% when the 5 $lb_f$ was applied, the masterbatch strand was considered to be stretchy. At slightly shorter cooling times than those listed in Table 8, the rigidity of the strand was significantly less than described in Table 8. At the cooling time listed in Table 8, enough crystallinity developed to convert the strands from the rubbery amorphous state to a rigid semi-crystalline state.

use of masterbatches. All of the compositions of these Examples and Comparative Examples were processed into films under essentially equivalent conditions, as discussed below.

Comparative Example 8 was produced from "Union Carbide DX5E98" polypropylene, available from Union Carbide Corp., Danbury, Conn., used with no additional additives. In this and the other examples in Tables 9 and 10 the polypropylene was cast into 2 mil films using a ¾" single screw lab extruder manufactured by C. W. Brabender Instruments, Inc., S. Hackensack, N.J., connected to a 6" wide slot film die. The material was extruded at 30 rpm extruder speed, corresponding to an extrusion output of about 3 lb/hr. The extrudate leaving the film die was cast onto 4 inch diameter casting rolls rotating at an appropriate speed to draw the film down to a nominal 2.0 mil thickness. The circulating water cooling the film casting rolls was at 45° C., and the temperature of the casting roll surface was

TABLE 8

| | | | | | Required Cooling Time | | |
|---|---|---|---|---|---|---|---|
| Example | Resin | Polymer | Extrudate Appearance | Strand Appearance | water bath (s) | after water bath (s) | Strand Rigidity after cooling |
| Comp. 4 | 50 wt % 2468 | 50 wt % FF020T PP | hazy | hazy | 4 | 24 | firm, stretchy |
| Comp. 5 | 65 wt % 2468 | 35 wt % FF020T PP | hazy | hazy | 4 | 12 | stiff, stretchy |
| 13 | 65 wt % 2468 | 35 wt % Dow 2035 | clear | clear | 4 | 2.5 | rigid |
| 14 | 65 wt % 2468 | 35 wt % M6580 | clear | hazy | 1 | 4 | rigid |
| Comp. 6 | 50 wt % MBG273 | 50 wt % FF020T PP | clear | clear | 4 | 25 | firm, stretchy |
| Comp. 7 | 65 wt % MBG273 | 35 wt % FF020T PP | clear | clear | 4 | 13 | stiff, stretchy |
| 15 | 65 wt % MBG273 | 20 wt % Dow 2035 + 15 wt % Fina 8473 | hazy | clear | 4 | 2.5 | rigid |

As seen from Table 8, masterbatch compositions in accordance with the present invention had much faster cooling measured to be in the range of 53° C. to 57° C. for the examples in Tables 9 and 10. Properties, particularly film haze, are dependent on casting roll temperature and in this regard the examples in Tables 9 and 10 were made using the same film casting procedure to obtain a good comparison of the effect of the resin masterbatches on film properties, independent of film casting procedure.

Comparative Example 9 and Examples 16–18 were produced by using masterbatches. In Comparative Example 9, the masterbatch was comprised of a 50 wt % level of "Res A-2468™" resin in "Montell PDC 1208" polypropylene. The masterbatches of Examples 16–18, contained high levels of "Res A-2468™" resin with various polyethylenes. The masterbatches of Table 9 were compounded using a "Brabender D-6" twin screw extruder available from C. W. Brabender Instrument Co., South Hackensack, N.J. These compounds were observed to give a visually homogenous extrudate with enough melt elasticity to allow the masterbatch compositions to be strand pelletized.

In Table 9 below, "Resin" refers to "Res A-2468™" resin available from Hercules Incorporated, Wilmington, Del. "PP" refers to "PDC 1120" polypropylene homopolymer available from Montell Polyolefins, Wilmington, Del. "Dow-LLDPE" refers to "Dow Engage 8100" LLDPE available from Dow Chemical, Midland, Mich. "HDPE" refers to "Alathon M6580" HDPE available from Equistar Chemicals, Houston, Tex. DSM-LLDPE refers to "DSM 1016LF" LLDPE available from DSM, Geleen, the Netherlands.

TABLE 9

| Example | Resin | PP | Dow-LLDPE | HDPE | DSM-LLDPE |
|---|---|---|---|---|---|
| Comp. 9 | 50 wt % | 50 wt % | | | |
| 16 | 75 wt % | | 15 wt % | 10 wt % | |
| 17 | 75 wt % | | 10 wt % | 15 wt % | |
| 18 | 78 wt % | | | | 22 wt % |

Each of the masterbatches was added to "Union Carbide DX5E98" polypropylene at a level sufficient to incorporate 10 wt % "" resin in the blend. The masterbatch and polypropylene were pre-blended to the correct composition and the pre-mixed blend was transferred to the feed hopper of the ¾" extruder used to cast the films. The temperature settings of the extruder were 140° C. (feed)/200° C./240° C./250° C. (die). Each pre-mixed blend was cast directly into 2 mil films using the same 6" wide cast film apparatus used to prepare the films of Comparative Example 8.

The resulting films had the optical properties and moisture barrier properties listed in Table 10 below. In Table 10, haze and clarity were measured through use of a "Haze-Gard+" optical tester available from Byk-Gardner USA, Columbia, Md. Still referring to Table 10, "MVTR" refers to moisture vapor transmission rate, as measured in accordance with ASTM E96, in units of (g-H2O-mil/day-m$^2$).

TABLE 10

| | | | MVTR | |
|---|---|---|---|---|
| Example | Haze (%) | Clarity (%) | Avg. Value | % Reduction |
| Comp. 8 | 6.65 | 98.3 | 10.5 | N/A |
| Comp. 9 | 2.80 | 99.1 | 6.9 | 34% |
| 16 | 2.37 | 99.1 | 6.9 | 34% |
| 17 | 3.02 | 98.8 | 6.0 | 43% |
| 18 | 3.97 | 96.4 | 7.2 | 32% |

From Table 10, it is seen that the cast polypropylene films of Examples 16–18 exhibited haze values roughly equivalent to the haze value of the polypropylene film of Comparative Example 9. In other words, the cast polypropylene films made from high resin content masterbatches containing polyethylene had similar haze values when compared with the haze value of polypropylene films made using 50 wt % resin/50 wt % polypropylene masterbatches (see e.g., Comparative Example 10 below). Thus, the addition of polyethylene to the polypropylene film via addition of resin and polyethylene masterbatches had minimal effect on the optical properties of the modified polypropylene films.

Table 10 also shows that the addition of "Res A-2468™" resin to the polypropylene film improves MVTR. In this regard, the polypropylene film of Comparative Example 9 had a 34% reduction in MVTR. Similarly, the polypropylene films of Examples 16–18 showed equivalent or identical reductions in MVTR when compared with Comparative Example 9.

In view of the above, minimal negative effect was observed as a result of the addition of polyethylene into the cast polypropylene film via the masterbatch formulations of Examples 16–18. Although the above-noted properties were measured in cast polypropylene films, it is expected that the same results would be observed in oriented polypropylene film.

EXAMPLES 19–26 AND COMPARATIVE EXAMPLES 10–11

These Examples and Comparative Examples involve making cast polypropylene films from "Montell PDC 1120" polypropylene homopolymer available from Montell Incorporated, Wilmington, Del. In one of the Comparative Examples, no resin was added to the film. The other Comparative Example and the Examples involve cast films modified with masterbatches containing "Res A-2468™" resin. All of the compositions of these Examples and Comparative Examples were processed into films under essentially equivalent conditions, as discussed below.

The film of Comparative Example 10 was made from this polypropylene with no resin added. The polypropylene was cast into a 1.7 mil film using a ¾" single screw extruder equipped with film casting die and casting rolls as described in Comparative Example 8. The compounds of Comparative Example 10 and the other examples listed in Tables 11 and 12 were extruded under essentially the same conditions. The speed of the casting rolls was adjusted to achieve the desired 1.7 mil nominal film thickness. In the examples described in Tables 11 and 12, the circulating water to the film casting rolls was at 35° C., and the surface of the casting rolls was measured to be 39° C. during film casting. The lower casting temperatures and reduced film thickness, relative to the previous examples, translated into reduced haze in the final films. All the examples in Tables 11 and 12 were cast into films under the same conditions so that the effect of the resin masterbatches on film properties could be measured, independent of film casting conditions.

In Comparative Example 11 and Examples 19–26, resin was added to the 25 polypropylene by pre-blending in masterbatches, having the compositions listed in Table 11, with "Montell PDC 1120" polypropylene at the appropriate level to achieve 10 wt % resin content in the final film. In these Examples and Comparative Example 11, the resin masterbatches were made by compounding the resin with the carrier polymer using a 32 mm counter-rotating "D-Tex" twin screw extruder manufactured by Davis-Standard, Pawcatuck, Conn. in a manner similar to the compounding procedure used in Examples 2–8. The extruder was connected to a "WRP-12V" water ring pelletizer manufactured by Berringer Division, Marblehead, Mass. as described in Examples 2–8.

In Table 11, "Resin" refers to "Res A-2468™" resin available from Hercules Incorporated, Wilmington, Del. "PP" refers to "Escorene 4292" polypropylene available from Exxon Chemical Corp., Houston, Tex. "Dow" refers to "Dowlex 2035" LLDPE available from Dow Chemical, Midland, Mich. "Montell" refers to "Montell 12C01" LLDPE available from Montell Polyolefins, Wilmington, Del. "HS-7001" refers to "Union Carbide HS-7001" LLDPE and "DFDB 9042" refers to "Union Carbide DFDB 9042", both available from Union Carbide Corp., Danbury, Conn. "M6580 HDPE" refers to "Alathon M6580" HDPE available from Lyondell Polymers Corp., Houston, Tex. "Fina 8473" refers to "Fina 8473" propylene-ethylene random copolymer containing 4.5 wt % ethylene, and "Fina 7425" refers to "Fina 7425" propylene-ethylene random copolymer containing 3 wt % ethylene, both available from Fina Oil and Chemical Company, Dallas, Tex.

"Montell 12C01" LLDPE which has an MI of 1.0 dg/min. Films containing the other masterbatches in accordance with the invention exhibited optical properties similar to those modified with 50 wt % polypropylene masterbatch Comparative A in Comparative Example 11. The film containing HDPE, Example 26, exhibited modestly higher haze than the films made from the other ternary masterbatches.

The LLDPE of masterbatches which yielded films having good optical properties can be characterized as high clarity cast film grade LLDPE having a density of less than 0.92 g/cm$^3$. The "Montell 12C01" LLDPE which yielded films having poorer optical properties can be characterized as a blown film grade LLDPE with an MI of 1.0 dg/min, which is typical for blown film grade LLDPE.

TABLE 11

| Masterbatch | Resin PP | LLDPE Dow | LLDPE Montell | LLDPE HS-7001 | LLDPE DFDB 9042 | M6580 HDPE | Propylene-ethylene copolymer Fina 8473 | Propylene-ethylene copolymer Fina 7425 |
|---|---|---|---|---|---|---|---|---|
| Comp. A | 50 wt % 50 wt % | | | | | | | |
| A | 80 wt % | 20 wt % | | | | | | |
| B | 80 wt % | | 20 wt % | | | | | |
| C | 80 wt % | | | 20 wt % | | | | |
| D | 80 wt % | | | | 20 wt % | | | |
| E | 80 wt % | 13 wt % | | | | | 7 wt % | |
| F | 80 wt % | 13 wt % | | | | | | 7 wt % |
| G | 80 wt % | | | 13 wt % | | | | 7 wt % |
| H | 80 wt % | | | | | 12 wt % | | 8 wt % |

In Examples 19–26 and Comparative Example 11 where resin masterbatch was used, enough masterbatch was added to incorporate 10 wt % of resin into the "Montell PDC I 120"polypropylene film as previously described. The films were cast under the same conditions as Comparative Example 10, i.e., the polymer blend compositions were cast into 1.7 mil films using the 3/4" Brabender single screw extruder connected to the 6" adjustable lip slot film die using a casting roll having a 39° C. surface temperature.

The resulting films had the optical and tensile properties as listed in Table 12 below. In Table 12, haze and clarity were measured through use of a "Haze-Gard+" optical tester available from Byk-Gardner USA, Columbia, Md. Further, "MB" refers to masterbatch. Tensile properties were measured in accordance with ASTM D-638 test procedure.

Overall, the optical properties of films modified with the masterbatches were similar to the films modified with 50 wt % polypropylene masterbatch Comparative A, except when the masterbatch contained LLDPE having an MI of 1.0 dg/min (masterbatch B) or HDPE (masterbatch H).

No reduction in tensile modulus was noted between films modified with 50 wt % polypropylene masterbatch Comparative A and films modified with masterbatches in accordance with the invention. Although there was concern that a reduction in stiffness could result from adding LLDPE to polypropylene films, there was no prominent effect on tensile properties due to the masterbatches. In this regard, it should be noted that the film modified with masterbatch containing HDPE exhibited higher modulus values as expected.

TABLE 12

| Example | MB | Haze (%) | Clarity (%) | Modulus (kpsi) MD | Modulus (kpsi) TD | Tensile strength (psi) MD | Tensile strength (psi) TD | Elongation (%) MD | Elongation (%) TD |
|---|---|---|---|---|---|---|---|---|---|
| Comp. 10 | None | 2.48 | 97.2 | 118.1 | 90.6 | 7794 | 3587 | 321 | 668 |
| Comp. 11 | Comp. A | 1.56 | 98.7 | 108.1 | 116.5 | 3995 | 3633 | 456 | 682 |
| 19 | A | 1.24 | 99.1 | 123.5 | 116.0 | 4070 | 3603 | 484 | 559 |
| 20 | B | 4.29 | 93.9 | 119.8 | 123.3 | 3918 | 3580 | 455 | 658 |
| 21 | C | 1.61 | 98.5 | 111.1 | 111.4 | 4322 | 3243 | 447 | 640 |
| 22 | D | 1.49 | 99.2 | 121.1 | 125.0 | 4153 | 3477 | 467 | 651 |
| 23 | E | 1.47 | 98.9 | 116.3 | 123.2 | 4139 | 3673 | 444 | 674 |
| 24 | F | 1.67 | 98.7 | 123.9 | 133.6 | 4373 | 3532 | 473 | 663 |
| 25 | G | 1.74 | 98.9 | 122.1 | 121.8 | 4515 | 3745 | 472 | 696 |
| 26 | H | 2.50 | 98.8 | 134.4 | 137.4 | 4482 | 3469 | 509 | 612 |

From Table 12, it is apparent that the haze and clarity values of all the resin modified films are better than or equivalent to the values for the unmodified polypropylene control film of Comparative Example 10, except for the film of Example 20 which is based on a masterbatch containing

EXAMPLES 27–35 AND COMPARATIVE EXAMPLES 12–17

These Examples and Comparative Examples involve preparing oriented polypropylene films (OPP films) from three different grades of polypropylene. For each polypropylene type, a Comparative Example was made where no resin was incorporated into the OPP film. Likewise, for each polypropylene type, another Comparative Example was prepared where resin was incorporated into the film using a masterbatch comprised of 60 wt % "Res A-2468™" resin in polypropylene. These Examples involve films made from combinations of the three different polypropylene types and three different masterbatches formed of resin and polyethylene. In all cases where the films were modified by resin addition, enough masterbatch was added to incorporate 10 wt % resin in the film.

The masterbatches listed in Table 13 were prepared by adding the resin and carrier polymer to an extruder. Taking into consideration that the feed rate for these examples was about 80 lb/hr, the rate at which the resin and carrier polymer are added to the extruder can be calculated from the information in Table 13. For instance, in Example 27, the total feed rate is about 80 lb/hr which means that to make the 80 wt % resin and 20 wt % polyethylene masterbatch, the resin is added at a rate of about 64 lb/hr and the polyethylene is added at a rate of about 16 lb/hr. These masterbatches were compounded using a 32 mm counter-rotating "D-Tex" twin screw extruder from Davis-Standard, Pawcatuck, Conn., in the same manner described in Examples 2–8. The masterbatch blends were pelletized using a Berringer water ring pelletizer operating with (4) die holes as previously described in Examples 2–8.

In Table 13, "2468" refers to "Res A-2468™" resin and "MBG 273" refers to "MBG 273™" resin, both available from Hercules Incorporated, Wilmington, Del. The polypropylene of masterbatch Comparative B in Table 13 was "FF020T" polypropylene available from Aristech Chemical Corp., Pittsburgh, Pa. The LLDPE was "Dowlex 2035" LLDPE available from Dow Chemical, Midland, Mich. The propylene-ethylene random copolymer was "Escorene PD 9272" available from Exxon Chemical Corp., Houston, Tex.

TABLE 13

| Masterbatch | Resin | | Polypropylene | LLDPE | propylene-ethylene copolymer |
| | 2468 | MBG 273 | | | |
| --- | --- | --- | --- | --- | --- |
| Comp. B | 60 wt % | | 40 wt % | | |
| I | 80 wt % | | | 20 wt % | |
| J | 80 wt % | | | 12 wt % | 8 wt % |
| K | | 80 wt % | | 12 wt % | 8 wt % |

Each of the above masterbatches was added to polypropylene to incorporate 10 wt % of resin in the blend. The masterbatches were pre-blended with the polypropylene in the same manner as in Examples 19–26 and the mixtures were directly cast into thick films using a ¾" Brabender single screw extruder with film die and casting rolls as described in Examples 19–26. The films made in the Examples and Comparative Examples listed in Table 14 were originally about 24 mils thick before being stretched into OPP film specimens. To make these thick films (relative to Examples 19–26), the extrusion speed was increased to 90–100 rpm and the casting roll speed was reduced (relative to the conditions in Examples 19–26) to make films having a nominal 24 mil thickness. As listed in Table 14 below, the polypropylene was "Aristech FF020T" polypropylene homopolymer as described above, "Montell PH384" polypropylene homopolymer available from Montell Incorporated, Wilmington, Del., or "Borealis HC 100F" polypropylene homopolymer available from Borealis, Copenhagen, Denmark.

No difficulty was observed when extruding blends containing 12.5 wt % of the masterbatches comprised of 80 wt % of resin. Each blend was extrusion cast into 25 mil films using a ¾" single screw extruder connected to a 6" wide adjustable lip slot film casting die as described above. The films were cooled on a film take-up assembly having 4 inch diameter casting rolls.

The thick sheets were stretched 6X6 into oriented polypropylene films using a T. M. Long tenter frame stretcher available from T. M. Long Co., Somerville, N.J. This means that the original thick film was stretched to 6 times its original length in both directions. This tenter frame stretcher is a device for making small samples of oriented polypropylene film in the laboratory, by preheating and biaxially stretching 2.25" squares of cast film into oriented polypropylene films having a nominal 12"×12" final size (after trimming).

The films were stretched using a 145° C. machine temperature setting and the minimum preheat time needed to heat the film so that it would stretch without breaking. The preheat times needed to stretch the modified films ranged from 25 to 33 seconds. The unmodified control films of Comparative Examples 12, 14, and 16 required longer preheat times, several seconds longer than for the modified films, in order for the unmodified specimens to stretch satisfactorily. The required preheat time also depended on the thickness of the starting film specimen, which varied modestly between samples, within a range of 23 to 27 mils. After preheating the specimen, a series of pneumatically driven clips clamped on the edge of the specimen are activated to simultaneously draw the specimen at the same rate in both directions, the 6X6 orientation process occurring in 1–2 seconds.

The resulting films had the haze properties as listed in Table 14 below. The haze was measured through use of a "Haze-Gard+" optical tester available from Byk-Gardner USA, Columbia, Md. The haze measurements were made by averaging the haze at 5 random areas of the film, and the results include some higher values measured in the thicker areas of the film which were not stretched as uniformly due to small thickness variations in the starting thick films and short preheat times. Several of the films exhibited these blemishes. As a result, adjusted haze measurements were made by averaging the haze at 5 areas of the film excluding the contribution of the minor thick sections of the film, as indicated in the Adjusted Haze column in Table 14.

Referring to Table 14, "Aristech" refers to "Aristech FF020T" polypropylene homopolymer, "Montell" refers to "Montell PH384" polypropylene homopolymer, and "Borealis" refers to "Borealis HC 100F" polypropylene homopolymer, all of which were described above. Still referring to Table 14, "MVTR" refers to moisture vapor transmission rate, as measured in accordance with ASTM E96. Tensile properties were measured in accordance with ASTM D-638 test procedure.

TABLE 14

| Example | Master-batch | PP | Haze (%) | Adj. haze (%) | Thickness (mils) MD | Thickness (mils) TD | Tensile Modulus (kpsi) MD | Tensile Modulus (kpsi) TD | Tensile strength (kpsi) MD | Tensile strength (kpsi) TD | Maximum strain (%) MD | Maximum strain (%) TD | MVTR (g · mil/day · m²) | ΔMVTR (% of control) |
|---|---|---|---|---|---|---|---|---|---|---|---|---|---|---|
| Comp. 12 | None | Aristech | 0.35 | 0.35 | 0.63 | 0.64 | 370 | 360 | 31.3 | 31.2 | 80 | 94 | 4.47 | — |
| Comp. 13 | Comp. B | Aristech | 0.73 | 0.73 | 0.78 | 0.75 | 418 | 418 | 28.4 | 27.2 | 107 | 102 | 3.23 | 28 |
| 27 | I | Aristech | 1.08 | 0.96 | 0.59 | 0.70 | 430 | 447 | 30.0 | 29.5 | 100 | 114 | 3.39 | 24 |
| 28 | J | Aristech | 1.07 | 0.78 | 0.64 | 0.77 | 416 | 419 | 28.3 | 26.2 | 107 | 118 | 3.43 | 23 |
| 29 | K | Aristech | 0.56 | 0.56 | 0.74 | 0.71 | 420 | 481 | 27.5 | 29.2 | 109 | 103 | — | — |
| Comp. 14 | None | Montell | 0.65 | 0.65 | 0.70 | 0.74 | 339 | 343 | 27.6 | 28.2 | 98 | 101 | 5.28 | — |
| Comp. 15 | Comp. B | Montell | 0.98 | 0.98 | 0.70 | 0.79 | 433 | 428 | 27.6 | 25.7 | 105 | 116 | 3.60 | 32 |
| 30 | I | Montell | 1.21 | 1.20 | 0.75 | 0.72 | 392 | 411 | 24.2 | 24.8 | 117 | 121 | 3.60 | 32 |
| 31 | J | Montell | 1.09 | 1.01 | 0.77 | 0.82 | 400 | 361 | 24.6 | 22.4 | 127 | 137 | 3.71 | 30 |
| 32 | K | Montell | 0.78 | 0.78 | 0.70 | 0.65 | 418 | 408 | 24.7 | 24.4 | 128 | 135 | — | — |
| Comp. 16 | None | Borealis | 0.96 | 0.96 | 0.66 | 0.70 | 414 | 421 | 31.6 | 30.9 | 99 | 96 | 3.87 | — |
| Comp. 17 | Comp. B | Borealis | 1.06 | 1.06 | 0.69 | 0.70 | 506 | 527 | 30.9 | 32.5 | 100 | 94 | 2.69 | 30 |
| 33 | I | Borealis | 1.51 | 1.26 | 0.72 | 0.73 | 503 | 537 | 31.4 | 31.1 | 87 | 99 | 2.42 | 37 |
| 34 | J | Borealis | 1.37 | 1.17 | 0.81 | 0.91 | 397 | 503 | 29.9 | 30.0 | 109 | 120 | 2.45 | 37 |
| 35 | K | Borealis | 0.77 | 0.77 | 0.64 | 0.60 | 491 | 547 | 31.4 | 32.6 | 94 | 90 | — | — |

From Table 14, it is seen that the masterbatches in accordance with the invention do not significantly increase the amount of haze relative to masterbatch Comparative B, a masterbatch in which the carrier polymer is polypropylene. Slightly higher haze values were measured for Examples made with masterbatch I or J, relative to the values for the Comparative Examples made with masterbatch Comparative B. However, this difference in haze decreased to a minimal level when the contribution due to thickness imperfections in several of the films was subtracted out, observed by comparing the adjusted haze values in Table 14. In contrast, the haze values measured for films of Examples 29, 32, and 35 modified with masterbatch K, i.e., a three component masterbatch including "MBG 273™" resin, were lower than comparable values measured for Comparative Examples incorporating masterbatch Comparative B.

Regarding tensile modulus, the OPP films of the Examples and Comparative Examples containing resin exhibited significantly higher tensile modulus than the unmodified films of Comparative Examples 12, 14, and 16. Modulus values for these unmodified examples varied according to the following order, high to low, "Borealis HC 100F" polypropylene>"Aristech FF020T" polypropylene>"Montell PH384" polypropylene. Correspondingly, resin modified films made from these same polymers exhibited the same trend, with resin addition causing similar increases relative to the modulus value of the unmodified films of the Comparative Examples. The modulus increase caused by masterbatch Comparative B was similar to the effect of masterbatches I, J, and K. In several of the examples, the modulus increase caused by masterbatches I, J, and K was equivalent to or greater than the increase caused by masterbatch Comparative B, while in some examples, particularly those involving the Montell polymer, the modulus increase appeared slightly less. Overall, the effect of the carrier polymer in novel masterbatches I, J, and K appeared minimal, as related to the stiffness of OPP films modified with these masterbatches. Each of masterbatches 1-K in accordance with the invention gave nearly the same increase in tensile modulus and slight reduction in tensile strength which was consistent with the effect of masterbatch Comparative B having 60 wt % resin.

Regarding moisture barrier properties, "Res A-2468™" resin improved the moisture barrier of oriented polypropylene films to a significant extent, and was more effective than "MBG 273™" resin in this regard.

Referring to Table 14, in each case the films modified with "Res A-2468™" resin, i.e., added via masterbatches Comparative B, I, and J, exhibited a significant improvement in moisture barrier, i.e., a reduction in MVTR, relative to the unmodified films of Comparative Examples 12, 14, and 16. The moisture barrier of the films was dependent on the polypropylene used but the effect of the different masterbatches was similar for each polypropylene grade. The films based on "Borealis HC 100F" polypropylene exhibited the best moisture barrier, while the films based on "Montell PH384" polypropylene exhibited the poorest barrier properties.

In films made from "Aristech FF020T" polypropylene, the 40 wt % polypropylene masterbatch Comparative B, appeared to give slightly better MVTR reduction (–28%) than masterbatches J (–24%) and K (–23%). The reverse was observed for "Borealis HC 100F" polypropylene films where masterbatches J and K both improved MVTR by –37% and masterbatch Comparative B improved MVTR by only –30%. In films made from "Montell PH384" polypropylene, all three masterbatches gave approximately the same reduction in MVTR (–30% to –32%).

Overall, it appears that all three masterbatch types were equivalent in their effect on moisture barrier of polypropylene films. Adding masterbatch to incorporate 10 wt % of "Res A-2468™" resin reduced MVTR by about 30%, with the extent of reduction being affected to a modest degree by the polypropylene used to make the film.

COMPARATIVE EXAMPLES 18–19

In Comparative Example 18, a 50/50 mixture comprising "Regalrez 1139®" resin, manufactured by Hercules Incorporated, and "Himont PD-403" polypropylene homopolymer, available from Himont Incorporated, was compounded using a Brabender D-6 model twin-screw extruder which contains two counter rotating intermeshing twin screws which are run at approximately 100 rpm. The temperature of the extruder at the feed throat was approximately 150° C. and the temperature of the extruder at the nozzle end was approximately 220° C. The extruder is run under starve feeding conditions in order to maximize residence time in the extruder and achieve optimal mixing before being subsequently pelletized.

In Comparative Example 19, a masterbatch was made according to the process of Comparative Example 18 except that the polypropylene used was "Escorene 4292" polypropylene which is a 2.0 MFR grade of polypropylene manufactured by Exxon Chemical.

The products of Comparative Examples 18 and 19 were ultimately extruded as a strand into a 2 foot long water bath to solidify the melt before pelletization. It was noted that the high level of "Regalrez 1139®" resin in Comparative Example 18 and 19 slowed down the crystallization/solidification process such that the strand was not rigid enough to chop cleanly until 40 seconds time elapsed after exiting the chill bath.

TABLE 15

| Example | RR 1139 Resin Content | PP Content | Strand Velocity (ft/sec) | Required Strand Length (Cooling Bath-Pelletizer) (feet) | Required Solidification Time (Pelletizer-Cooling Bath) (seconds) |
|---|---|---|---|---|---|
| Comp. 18 | 50 wt % | 50 wt % "Himont PD-403" | 15 | 10 | 40 |
| Comp. 19 | 50 wt % | 50 wt % "Escorene 4292" | 15 | 10 | 40 |

The slow solidification of Comparative Examples 18 and 19 made it difficult to efficiently convert these mixtures into pellet form. This difficulty impacts strongly on the process of making resin masterbatches in polypropylene and further serves to illustrate the advantages of the new type of masterbatch compositions described in the previous examples.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A masterbatch, comprising:
    at least about 65 wt % of resin having a R&B softening point as measured in accordance with ASTM 28-67; and
    carrier polymer having a peak melting temperature, as measured by DSC, up to about 20° C. greater than the R&B softening point of the resin.

2. The masterbatch of claim 1, wherein the carrier polymer has a peak melting temperature, as measured by DSC, no greater than about 10° C. above the R&B softening point of the resin.

3. The masterbatch of claim 1, wherein the carrier polymer has a melt index of about 0.5 to 30 dg/min, as measured in accordance with ASTM D-1238, 190° C. and 2.16 kg load.

4. The masterbatch of claim 1, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

5. The masterbatch of claim 3, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

6. Masterbatch pellet made by a method, comprising:
    mixing:
        resin having a R&B softening point as measured in accordance with ASTM 28-67, and
        carrier polymer having a peak melting temperature, as measured by DSC, up to about 20° C. greater than the R&B softening point of the resin to form masterbatch composition comprising at least about 65 wt % of resin; and
    pelletizing the masterbatch composition into masterbatch pellet.

7. The masterbatch pellet of claim 6, wherein the carrier polymer has a peak melting temperature, as measured by DSC, no greater than about 10° C. above the R&B softening point of the resin.

8. The masterbatch pellet of claim 6, wherein the carrier polymer has a melt index of about 0.5 to 30 dg/min, as measured in accordance with ASTM D-1238, 190° C. and 2.16 kg load.

9. The masterbatch pellet of claim 6, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

10. The masterbatch pellet of claim 8, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

11. The masterbatch pellet of claim 6, wherein the resin has a R&B softening point of at least about 70° C., as measured in accordance with ASTM 28-67.

12. The masterbatch pellet of claim 6, wherein the masterbatch comprises about 70 to 90 wt % of resin.

13. The masterbatch pellet of claim 6, wherein the carrier polymer comprises primary carrier polymer and secondary carrier polymer.

14. The masterbatch of claim 6, wherein the carrier polymer comprises polyethylene.

15. The masterbatch pellet of claim 6, wherein the polyethylene comprises linear low density polyethylene (LLDPE).

16. The masterbatch pellet of claim 6, wherein the mixing comprises an initial mixing which is carried out at a masterbatch temperature within about 20° C. of the R&B softening point of the resin and within about 20° C. of the peak melting temperature, as measured by DSC, of the carrier polymer.

17. The masterbatch pellet of claim 6, wherein the mixing is carried out in a twin screw extruder under shear conditions in which less than about 70 watt-hr/lb of mechanical energy is required for substantial homogenization of the masterbatch composition.

18. The masterbatch pellet of claim 6, wherein a ratio of a viscosity of molten carrier polymer to a Brookfield viscosity of the resin is less than about 20 to 1, wherein the viscosities are measured at 10C above the peak melting temperature, as measured by DSC, of the carrier polymer and the carrier polymer is molten during viscosity measurement, wherein the Brookfield viscosity is measured in accordance with ASTM D-6267, and wherein the viscosity of the carrier polymer is measured by capillary shear rheometry with a shear rate of $1000\ s^{-1}$.

19. A method of making a masterbatch, comprising:
mixing:
resin having a R&B softening point as measured in accordance with ASTM 28-67, and
carrier polymer having a peak melting temperature, as measured by DSC, up to about 20° C. greater than the R&B softening point of the resin to form a masterbatch comprising at least about 65 wt % of resin.

20. The method of claim 19, wherein the carrier polymer has a peak melting temperature, as measured by DSC, no greater than about 10° C. above the R&B softening point of the resin.

21. The method of claim 19, wherein the carrier polymer has a melt index of about 0.5 to 30 dg/min, as measured in accordance with ASTM D-1238, 190° C. and 2.16 kg load.

22. The method of claim 19, wherein the carrier polymer is such that a test masterbatch comprising 65 wt % of test resin and 35 wt % of the carrier polymer would solidify, so that the test masterbatch would stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

23. The method of claim 21, wherein the carrier polymer is such that a test masterbatch comprising 65 wt % of test resin and 35 wt % of the carrier polymer would solidify, so that the test masterbatch would stretch less than 5% when 5 $lb_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

24. The method of claim 19, wherein the masterbatch comprises about 70 to 90 wt % of resin.

25. The method of claim 19, wherein the resin comprises hydrogenated resin.

26. The method of claim 19, wherein the resin comprises C9 hydrocarbon resin.

27. The method of claim 19, wherein the resin comprises dicyclopentadiene hydrocarbon resin.

28. The method of claim 19, wherein the carrier polymer comprises primary carrier polymer and secondary carrier polymer.

29. The method of claim 19, wherein the peak melting temperature, as measured by DSC, of the carrier polymer is less than about 1 50° C.

30. The method of claim 19, wherein the carrier polymer comprises polyethylene.

31. The method of claim 30, wherein the polyethylene comprises linear low density polyethylene (LLDPE).

32. The method of claim 19, wherein the carrier polymer comprises propylene-ethylene random copolymer.

33. The method of claim 19, wherein the mixing comprises an initial mixing which is carried out at a masterbatch temperature within about 20° C. of the R&B softening point of the resin and within 20° C. of the peak melting temperature, as measured by DSC, of the carrier polymer.

34. The method of claim 19, wherein the mixing is carried out in a twin screw extruder shear conditions in which less than about 70 watt-hr/lb of mechanical energy is required for substantial homogenization of the masterbatch composition.

35. The method of claim 19, wherein a ratio of a viscosity of molten carrier polymer to a Brookfield viscosity of the resin is less than about 20 to 1, wherein the viscosities are measured at 10° C. above the peak melting temperature, as measured by DSC, of the carrier polymer and the carrier polymer is molten during viscosity measurement, wherein the Brookfield viscosity is measured in accordance with ASTM D-6267, and wherein the viscosity of the carrier polymer is measured by capillary shear rheometry with a shear rate of $1000\ s^{-1}$.

36. The method of claim 19, wherein forming the masterbatch comprises mixing the resin and the carrier polymer to form a masterbatch composition and pelletizing the masterbatch composition.

37. A method for making polymer product, comprising:
forming a masterbatch comprising:
at least about 65 wt % of resin having a R&B softening point as measured in accordance with ASTM 28-67, and
carrier polymer having a peak melting temperature, as measured by DSC, up to about 20° C. greater than the R&B softening point of the resin;
combining the masterbatch with blend polymer to form polymer blend; and
forming the polymer blend into polymer product.

38. The method of claim 37, wherein the carrier polymer has a peak melting temperature, as measured by DSC, no greater than about 10° C. above the R&B softening point of the resin.

39. The method of claim 37, wherein the carrier polymer has a melt index of about 0.5 to 30 dg/min, as measured in accordance with ASTM D-1238, 190° C. and 2.16 kg load.

40. The method of claim 37, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

41. The method of claim 39, wherein the carrier polymer is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C. load.

42. The method of claim 37, wherein the masterbatch comprises about 70 to 90 wt % of resin.

43. The method of claim 37, wherein the carrier polymer comprises primary carrier polymer and secondary carrier polymer.

44. The method of claim 37, wherein the peak melting temperature, as measured by DSC, of the carrier polymer is less than about 150° C.

45. The method of claim 37, wherein the carrier polymer comprises polyethylene.

46. The method of claim 45, wherein the polyethylene comprises linear low density polyethylene (LLDPE).

47. The method of claim 37, wherein the carrier polymer comprises propylene-ethylene random copolymer.

48. The method of claim 37, wherein forming the masterbatch comprises an initial mixing which is carried out a temperature within about 20° C. of the R&B softening point of the resin and within about 20° C. of the peak melting temperature, as measured by DSC, of the carrier polymer.

49. The method of claim 37, wherein forming the masterbatch comprises mixing in a twin screw extruder under shear conditions in which less than about 70 watt-hr/lb of mechanical energy is required for substantial homogenization of the masterbatch composition.

50. The method of claim 37, wherein a ratio of a viscosity of molten carrier polymer to a Brookfield viscosity of the resin is less than about 20 to 1, wherein the viscosities are measured at 10° C. above the peak melting temperature, as measured by DSC, of the carrier polymer and the carrier polymer is molten during viscosity measurement, wherein the Brookfield viscosity is measured in accordance with ASTM D-6267, and wherein the viscosity of the carrier polymer is measured by capillary shear rheometry with a shear rate of 1000 s$^{-1}$.

51. The method of claim 37, wherein forming the masterbatch comprises mixing the resin and the carrier polymer to form a masterbatch composition and pelletizing the masterbatch composition.

52. The method of claim 37, wherein the polymer blend comprises about 2 to 25 wt % of masterbatch.

53. The method of claim 37, wherein forming the polymer blend into polymer product comprises extruding the polymer blend.

54. A masterbatch, comprising:
at least about 65 wt % of resin; and
carrier polymer which is such that a test masterbatch comprising 65 wt % of test resin and 35 wt % of the carrier polymer would solidify, so that the masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

55. Masterbatch pellet made by a method, comprising:
mixing:
resin having a R&B softening point as measured in accordance with ASTM 28-67, and
carrier polymer which is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.
to form masterbatch composition comprising at least about 65 wt % of resin; and
pelletizing the masterbatch composition into masterbatch pellet.

56. A method of making a masterbatch, comprising:
mixing:
resin, and
carrier polymer which is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.

57. A method for making polymer product, comprising:
forming a masterbatch comprising:
at least about 65 wt % of resin, and
carrier polymer which is such that a test masterbatch comprising 65 wt % of test resin and 35 wt % of the carrier polymer would solidify, so that the test masterbatch would stretch less than 5% when 5 lb$_f$ is applied to an extruded test masterbatch strand, within about 10 seconds after exiting a 25° C. water bath in which the extruded test masterbatch strand is submerged for up to 4 seconds, wherein the test resin is a hydrogenated C9 hydrocarbon resin having a R&B softening point of 140° C., and wherein the extruded test masterbatch strand is extruded at a rate of 1.0 to 1.2 kg/hr/strand while drawing the strand at a nominal rate of 17 cm/s using a pelletizer, has a 0.05 to 0.06 inch diameter, and enters the water bath at a temperature of 200±10° C.;

combining the masterbatch with blend polymer to form polymer blend; and forming the polymer blend into polymer product.

58. The method of making a polymer product of claim 57, wherein the polymer product comprises a film.

59. A polymer product made in accordance with the method of claim 57, and wherein the polymer product comprises a film.

* * * * *